United States Patent
Corbridge et al.

(10) Patent No.: US 8,712,324 B2
(45) Date of Patent: Apr. 29, 2014

(54) INDUCTIVE SIGNAL TRANSFER SYSTEM FOR COMPUTING DEVICES

(75) Inventors: Mark Corbridge, Weymouth Dorset (GB); Manjirnath Chatterjee, San Francisco, CA (US); Michael Lehr, Sunnyvale, CA (US); Allan Hessenflow, Los Gatos, CA (US); Stuart Neubarth, Sunnyvale, CA (US); Jacob Rasco, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1253 days.

(21) Appl. No.: 12/478,766

(22) Filed: Jun. 4, 2009

(65) Prior Publication Data

US 2010/0083012 A1 Apr. 1, 2010

Related U.S. Application Data

(63) Continuation-in-part of application No. 12/239,656, filed on Sep. 26, 2008, now Pat. No. 8,385,822.

(60) Provisional application No. 61/142,560, filed on Jan. 5, 2009, provisional application No. 61/142,194, filed on Dec. 31, 2008, provisional application No. 61/142,195, filed on Jan. 1, 2009, provisional application No. 61/142,602, filed on Jan. 5, 2009.

(51) Int. Cl.
*H04B 5/00* (2006.01)
(52) U.S. Cl.
USPC .......................................................... 455/41.1

(58) Field of Classification Search
USPC ............ 455/41.1, 41.2, 572, 573, 574, 127.1,
455/127.5, 274, 280, 284, 286, 292
See application file for complete search history.

(56) References Cited

U.S. PATENT DOCUMENTS

| | | | |
|---|---|---|---|
| 5,375,226 A | 12/1994 | Sano et al. |
| 5,455,466 A | 10/1995 | Parks et al. |
| 5,596,567 A | 1/1997 | de Muro et al. |
| 5,600,225 A | 2/1997 | Goto |
| 5,666,530 A | 9/1997 | Clark et al. |
| 5,733,313 A | 3/1998 | Barreras et al. |
| 5,760,580 A | 6/1998 | Tyren |
| 5,831,348 A | 11/1998 | Nishizawa |
| 5,958,051 A | 9/1999 | Renaud et al. |

(Continued)

FOREIGN PATENT DOCUMENTS

| | | |
|---|---|---|
| CN | 1592197 A | 3/2005 |
| CN | 1956288 A | 5/2007 |

(Continued)

OTHER PUBLICATIONS

International Search Report and Written Opinion, International Application No. PCT/US2011/058449, Date of Mailing: May 16, 2012, pp. 1-11.

(Continued)

*Primary Examiner* — Eugene Yun
(74) *Attorney, Agent, or Firm* — Mahamedi Paradice Kreisman LLP

(57) ABSTRACT

At least two devices are provided that can each form part of a system to inductively exchange power and data. One device is capable of inductively transmitting a power signal to a second device, and to receive feedback from the second device in order to regulate the power signal.

35 Claims, 22 Drawing Sheets

(56) References Cited

U.S. PATENT DOCUMENTS

| | | |
|---|---|---|
| 6,006,274 A | 12/1999 | Hawkins et al. |
| 6,138,245 A | 10/2000 | Son et al. |
| 6,184,651 B1 | 2/2001 | Fernandez et al. |
| 6,266,539 B1 | 7/2001 | Pardo |
| 6,330,436 B1 | 12/2001 | Zidel |
| 6,389,423 B1 | 5/2002 | Sakakura |
| 6,405,049 B2 | 6/2002 | Herrod et al. |
| 6,436,299 B1 | 8/2002 | Baarman et al. |
| 6,445,936 B1 | 9/2002 | Cannon et al. |
| 6,501,364 B1 | 12/2002 | Hui et al. |
| 6,510,424 B1 | 1/2003 | Ford et al. |
| 6,532,152 B1 | 3/2003 | White et al. |
| 6,671,700 B1 | 12/2003 | Creemer et al. |
| 6,673,250 B2 | 1/2004 | Kuennen et al. |
| 6,731,071 B2 | 5/2004 | Baarman |
| 6,795,110 B1 | 9/2004 | Kossin |
| 6,803,744 B1 | 10/2004 | Sabo |
| 6,806,649 B2 | 10/2004 | Mollema et al. |
| 6,810,405 B1 | 10/2004 | LaRue et al. |
| 6,812,645 B2 | 11/2004 | Baarman |
| 6,825,620 B2 | 11/2004 | Kuennen et al. |
| 6,831,417 B2 | 12/2004 | Baarman |
| 6,850,986 B1 | 2/2005 | Peacock |
| 6,888,438 B2 | 5/2005 | Hui et al. |
| 6,892,052 B2 | 5/2005 | Kotola et al. |
| 6,917,163 B2 | 7/2005 | Baarman |
| 6,975,198 B2 | 12/2005 | Baarman et al. |
| 6,986,051 B2 | 1/2006 | Le Pennec et al. |
| 7,065,658 B1 | 6/2006 | Baraban et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,132,918 B2 | 11/2006 | Baarman et al. |
| 7,149,473 B1 | 12/2006 | Lindlar et al. |
| 7,164,255 B2 | 1/2007 | Hui |
| 7,202,783 B2 | 4/2007 | Want et al. |
| 7,236,742 B2 | 6/2007 | Hall et al. |
| 7,248,017 B2 | 7/2007 | Cheng et al. |
| 7,262,700 B2 | 8/2007 | Hsu |
| 7,271,569 B2 | 9/2007 | Oglesbee |
| 7,286,880 B2 | 10/2007 | Olson et al. |
| 7,313,364 B2 | 12/2007 | Morimoto |
| 7,331,793 B2 | 2/2008 | Hernandez et al. |
| 7,352,567 B2 | 4/2008 | Hotelling et al. |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,392,059 B2 | 6/2008 | White et al. |
| 7,414,380 B2 | 8/2008 | Tang et al. |
| 7,446,672 B2 | 11/2008 | Johnson et al. |
| 7,454,170 B2 | 11/2008 | Goossens et al. |
| 7,462,951 B1 | 12/2008 | Baarman |
| 7,471,200 B2 | 12/2008 | Otranen |
| 7,471,986 B2 | 12/2008 | Hatlestad |
| 7,495,414 B2 | 2/2009 | Hui |
| 7,509,432 B1 | 3/2009 | Peacock |
| 7,521,890 B2 | 4/2009 | Lee et al. |
| 7,565,108 B2 | 7/2009 | Kotola et al. |
| 7,576,514 B2 | 8/2009 | Hui |
| 7,576,657 B2 | 8/2009 | Duron et al. |
| 7,743,151 B2 | 6/2010 | Vallapureddy et al. |
| 7,751,810 B1 | 7/2010 | Bernoske et al. |
| 7,791,311 B2 | 9/2010 | Sagoo |
| 7,800,044 B1 | 9/2010 | Kahn et al. |
| 7,855,529 B2 | 12/2010 | Liu |
| D640,976 S | 7/2011 | Matsuoka |
| 8,026,693 B2 | 9/2011 | Burley |
| 8,026,694 B2 | 9/2011 | Kamijo et al. |
| 2002/0065045 A1 | 5/2002 | Kim |
| 2002/0084698 A1 | 7/2002 | Kelly et al. |
| 2002/0103008 A1 | 8/2002 | Rahn et al. |
| 2003/0092389 A1 | 5/2003 | Morimoto |
| 2003/0214255 A1 | 11/2003 | Baarman et al. |
| 2003/0233455 A1 | 12/2003 | Leber et al. |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2005/0007067 A1 | 1/2005 | Baarman et al. |
| 2005/0030160 A1 | 2/2005 | Goren et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2005/0186903 A1* | 8/2005 | Forbes et al. ............... 455/41.1 |
| 2006/0041420 A1 | 2/2006 | Martin et al. |
| 2006/0061958 A1 | 3/2006 | Solomon et al. |
| 2006/0094405 A1 | 5/2006 | Dupont |
| 2006/0123055 A1 | 6/2006 | Atkinson et al. |
| 2006/0132045 A1 | 6/2006 | Baarman |
| 2006/0145660 A1 | 7/2006 | Black et al. |
| 2006/0183462 A1 | 8/2006 | Kolehmainen |
| 2006/0229027 A1 | 10/2006 | Wang et al. |
| 2006/0258289 A1 | 11/2006 | Dua |
| 2007/0024238 A1 | 2/2007 | Nakade et al. |
| 2007/0035917 A1 | 2/2007 | Hotelling et al. |
| 2007/0064406 A1 | 3/2007 | Beart |
| 2007/0077965 A1 | 4/2007 | Fox |
| 2007/0120752 A1 | 5/2007 | Takasu |
| 2007/0182367 A1 | 8/2007 | Partovi |
| 2007/0188284 A1 | 8/2007 | Dobbs |
| 2007/0246546 A1 | 10/2007 | Yoshida |
| 2007/0255435 A1 | 11/2007 | Cohen et al. |
| 2007/0290654 A1 | 12/2007 | Govari et al. |
| 2008/0133918 A1 | 6/2008 | You et al. |
| 2008/0196086 A1 | 8/2008 | Shintani et al. |
| 2008/0231537 A1 | 9/2008 | Rofougaran et al. |
| 2008/0269927 A1 | 10/2008 | Szolyga et al. |
| 2008/0278894 A1 | 11/2008 | Chen et al. |
| 2009/0001932 A1 | 1/2009 | Kamijo et al. |
| 2009/0001941 A1 | 1/2009 | Hsu et al. |
| 2009/0008148 A1 | 1/2009 | Mashino |
| 2009/0069869 A1 | 3/2009 | Stouffer et al. |
| 2009/0088077 A1 | 4/2009 | Brown et al. |
| 2009/0096413 A1 | 4/2009 | Partovi et al. |
| 2009/0106567 A1 | 4/2009 | Baarman |
| 2009/0170433 A1 | 7/2009 | Rhodes et al. |
| 2009/0193500 A1 | 7/2009 | Griffin et al. |
| 2009/0199219 A1 | 8/2009 | Rofougaran et al. |
| 2009/0203399 A1 | 8/2009 | Rofougaran |
| 2009/0212637 A1 | 8/2009 | Baarman et al. |
| 2009/0212737 A1 | 8/2009 | Johnson et al. |
| 2009/0233623 A1 | 9/2009 | Johnson |
| 2010/0007449 A1 | 1/2010 | Tait et al. |
| 2010/0021176 A1 | 1/2010 | Holcombe et al. |
| 2010/0023204 A1 | 1/2010 | Basir et al. |
| 2010/0045269 A1 | 2/2010 | LaFranchise et al. |
| 2010/0070219 A1 | 3/2010 | Azancot et al. |
| 2010/0076524 A1 | 3/2010 | Forsberg et al. |
| 2010/0081377 A1 | 4/2010 | Corbridge et al. |
| 2010/0081473 A1 | 4/2010 | Chatterjee et al. |
| 2010/0081483 A1 | 4/2010 | Chatterjee et al. |
| 2010/0083012 A1 | 4/2010 | Corbridge et al. |
| 2010/0093279 A1 | 4/2010 | Linsky et al. |
| 2010/0121965 A1 | 5/2010 | Chatterjee |
| 2010/0131691 A1 | 5/2010 | Chatterjee et al. |
| 2010/0146308 A1 | 6/2010 | Gioscia et al. |
| 2010/0156193 A1 | 6/2010 | Rhodes et al. |
| 2010/0172090 A1 | 7/2010 | Chatterjee |
| 2010/0174801 A1 | 7/2010 | Tabaaloute |
| 2010/0177476 A1 | 7/2010 | Hotelling et al. |
| 2010/0194336 A1 | 8/2010 | Azancot et al. |
| 2010/0198453 A1 | 8/2010 | Dorogusker et al. |
| 2010/0211785 A1 | 8/2010 | Park et al. |
| 2010/0250986 A1 | 9/2010 | Black et al. |
| 2010/0283599 A1 | 11/2010 | Ma et al. |
| 2011/0076941 A1 | 3/2011 | Taveau et al. |
| 2012/0077432 A1 | 3/2012 | Rose et al. |

(56) References Cited

U.S. PATENT DOCUMENTS

FOREIGN PATENT DOCUMENTS

| | | | |
|---|---|---|---|
| CN | 101095272 A | 12/2007 |
| CN | 101228678 A | 7/2008 |
| EP | 395469 A2 | 10/1990 |
| FR | 2601161 A1 | 1/1998 |
| GB | 2389720 B | 9/2005 |
| GB | 2399466 B | 11/2005 |
| GB | 2389767 B | 4/2006 |
| JP | 09-259241 A | 10/1997 |
| JP | H10-290705 A | 11/1998 |
| JP | 11-354348 A | 12/1999 |
| JP | 3161388 B2 | 2/2001 |
| KR | 10-0836634 B1 | 6/2008 |
| KR | 10-0863420 B1 | 10/2008 |
| KR | 10-2010-0136255 A | 12/2010 |
| WO | WO 95/03686 A1 | 2/1995 |
| WO | WO 2005/024865 A2 | 3/1995 |
| WO | WO 2004/098079 A1 | 11/2004 |
| WO | WO 2008/033670 A2 | 3/2008 |
| WO | WO 2008/044875 A1 | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO-2010/077994 A2 | 7/2010 |
| WO | WO 2010/091269 A1 | 8/2010 |

OTHER PUBLICATIONS

U.S. Appl. No. 12/916,388, filed Oct. 29, 2010, Chatterjee et al.
U.S. Appl. No. 12/975,335, filed Dec. 21, 2010, Oh et al.
U.S. Appl. No. 12/987,940, filed Jan. 10, 2011, Chatterjee et al.
Non-Final Office Action mailed Nov. 3, 2010 in U.S. Appl. No. 12/478,616 12 pgs.
U.S. Appl. No. 29/323,686, filed Aug. 28, 2008, Matsuoka et al.
U.S. Appl. No. 11/430,786, filed May 8, 2006, Baraban et al.
U.S. Appl. No. 12/628,401, filed Dec. 1, 2009, Chatterjee.
U.S. Appl. No. 12/840,241, filed Jul. 20, 2010, Chatterjee.
U.S. Appl. No. 12/841,001, filed Jul. 21, 2010, Chatterjee.
U.S. Appl. No. 29/323,688, filed Aug. 28, 2008, Matsuoka.
Final Office Action mailed Jan. 8, 2009 in U.S. Appl. No. 11/430,786.
Final Office Action mailed Oct. 25, 2004 in U.S. Appl. No. 09/861,658 10 pgs.
Final Office Action mailed Jul. 9, 2007 in U.S. Appl. No. 11/430,786.
Final Office Action mailed Jul. 19, 2010 in U.S. Appl. No. 11/430,786.
Final Office Action mailed Dec. 30, 2009 in U.S. Appl. No. 11/430,786.

Hui et al., "A New Generation of Universal Contactless Battery Charging Platform for Portable Consumer Electronic Equipment," IEEE Trans Power Electronics, 20(3):620-627 (2005).
International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion dated Aug. 20, 2010 in International Application No. PCT/US2009/069847.
International Search Report and Writen Opinion dated Aug. 31, 2010 in International Application No. PCT/US2010/020054.
International Search Report and Written Opinion dated Apr. 20, 2010 in International Application No. PCT/US2009/055928.
Kean, Steven, "Powermat Portable Wireless Charging Mat", pp. 1-12 dwnloaded from http://www.bigbruin.com/content/powermat_1 on Sep. 29, 2010.
Liang et al., "An implantable bi-directional wireless transmission system for transcutaneous biological signal recording," Physiol. Meas. 26:83-97 (2005).
Mel B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782,.
Non-Final Office Action mailed Mar. 24, 2010 in U.S. Appl. No. 11/430,786.
Non-Final Office Action mailed Jul. 25, 2008 in U.S. Appl. No. 11/430,786.
Non-Final Office Action mailed Sep. 30, 2010 in U.S. Appl. No. 11/430,786 7 pgs.
Non-Final Office Action mailed Jan. 25, 2008 in U.S. Appl. No. 11/430,786.
Non-Final Office Action mailed Oct. 5, 2006 in U.S. Appl. No. 11/430,786.
Non-Final Office Action mailed Apr. 22, 2004 in U.S. Appl. No. 09/861,658 7 pgs.
Non-Final Office Action mailed Apr. 7, 2005 in U.S. Appl. No. 09/861,658 11 pgs.
Non-Final Office Action mailed Jun. 11, 2009 in U.S. Appl. No. 11/430,786.
Notice of Allowance mailed Jan. 9, 2006 in U.S. Appl. No. 09/861,658 12 pgs.
Opticon Users manual DWT 7133, Nov. 2000.
International Search Report and Written Opinion, International Application No. PCT/US2012/024202, Date of Completion: Apr. 26, 2012, Date of Mailing: Apr. 27, 2012, pp. 1-9.
AdvancedCardSystems, "ACR122U NFC Contactless Smart Card Reader—URL Transfer," available at URL < http://www.youtube.com/watch?v=USImfpCZaTo >, uploaded Oct. 12, 2010.
Extended European Search Report, European Application No. 11186983.0, Apr. 24, 2012, pp. 1-15.
Office Action, Application No. CN 201080052070.1, Date of issuance: Jan. 6, 2014, pp. 1-12.

* cited by examiner

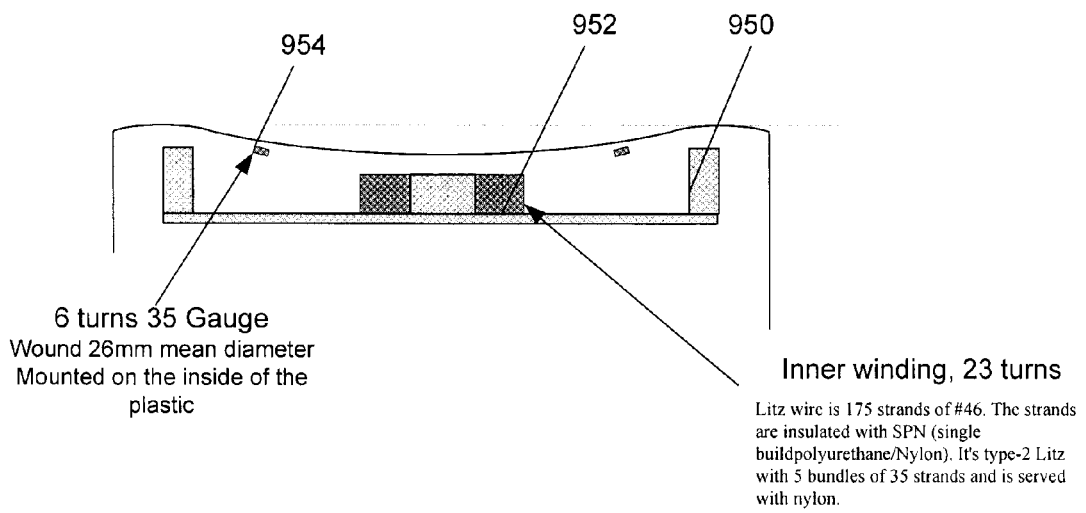

954
952
950

6 turns 35 Gauge
Wound 26mm mean diameter
Mounted on the inside of the plastic

Inner winding, 23 turns

Litz wire is 175 strands of #46. The strands are insulated with SPN (single buildpolyurethane/Nylon). It's type-2 Litz with 5 bundles of 35 strands and is served with nylon.

FIG. 9D

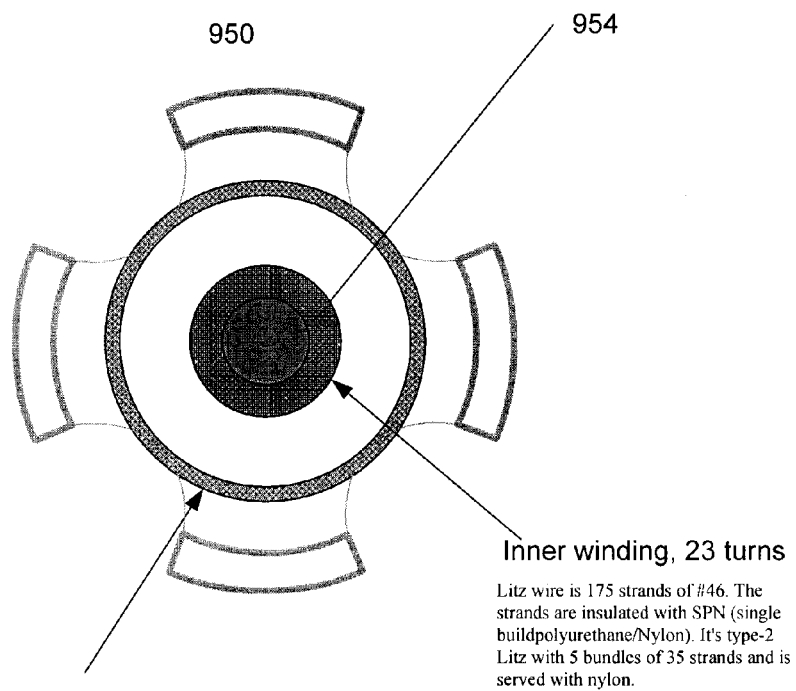

950
954

Inner winding, 23 turns

Litz wire is 175 strands of #46. The strands are insulated with SPN (single buildpolyurethane/Nylon). It's type-2 Litz with 5 bundles of 35 strands and is served with nylon.

6 turns 35 Gauge
Wound 26mm mean diameter
Mounted on the inside of the plastic

INDUCTIVE SIGNAL TRANSFER SYSTEM FOR COMPUTING DEVICES

RELATED APPLICATIONS

This application is a continuation-in-part of U.S. patent application Ser. No. 12/239,656, filed Sep. 26, 2008 now U.S. Pat. No. 8,385,822, entitled ORIENTATION AND PRESENCE DETECTION FOR USE IN CONFIGURING OPERATIONS OF COMPUTING DEVICES IN DOCKED ENVIRONMENTS; the aforementioned application being hereby incorporated by reference in its entirety.

This application claims benefit of priority to the following applications: Provisional U.S. Patent Application No. 61/142,560, filed Jan. 5, 2009, entitled ELECTRICAL APPARATUS FOR REAL TIME WIRELESS POWER DELIVERY; Provisional U.S. Patent Application No. 61/142,194, filed Dec. 31, 2008, entitled PROTOCOL FOR REAL TIME POWER AND ACCESSORY DATA CONNECTION; Provisional U.S. Patent Application No. 61/142,195, filed Jan. 1, 2009, entitled TECHNIQUES FOR MAGNETICALLY COUPLING CHARGING CIRCUITS AND DEVICES; Provisional U.S. Patent Application Nos. 61/142,602, filed Jan. 5, 2009, entitled MAGNETIC CLASP WITH MULTIPLE ORIENTATIONS AND ORIENTATION DETECTION; all of the aforementioned priority applications being hereby incorporated by reference in their entirety.

BACKGROUND

The use of docking stations and other accessory devices in connection with mobile computing devices (e.g. smart phones, media players etc.) is well known. Traditionally, docking stations are used to (i) recharge or supply power to the mobile computing device, (ii) enable the computing device to communicate with other devices connected to the docking station (e.g. synchronization with a personal computer), or (iii) use additional resources provided with the docking station (e.g. speakers for audio output).

In a traditional scheme, docking stations and mobile computing devices connect using insertive male/female connectors. Numerous factors come into consideration when mobile devices are designed with connectors for use with docking stations. For example, such connectors typically take into account the ease by which users may establish the connection (e.g. can the user simply drop the device into the cradle), as well as the mechanical reliability of the connectors. When users repeatedly mate devices with docking stations, both the mating action and the removal of the device from the docking station can strain the connector structure and its elements.

Connectors also restrain the amount by which a device's form factor can be reduced in thickness and/or other dimensions. Connector schemes (particularly those that abide by an industry standard) have constraints that dictate the physical dimensions of the male and female ends of the connectors. As devices get smaller, accommodating the size constraints of the connectors has become more challenging.

BRIEF DESCRIPTION OF THE DRAWINGS

FIG. 9D and FIG. 9E illustrate a coil assembly or subassembly for use on one or both devices, under another embodiment.

DETAILED DESCRIPTION

Figure 1A:
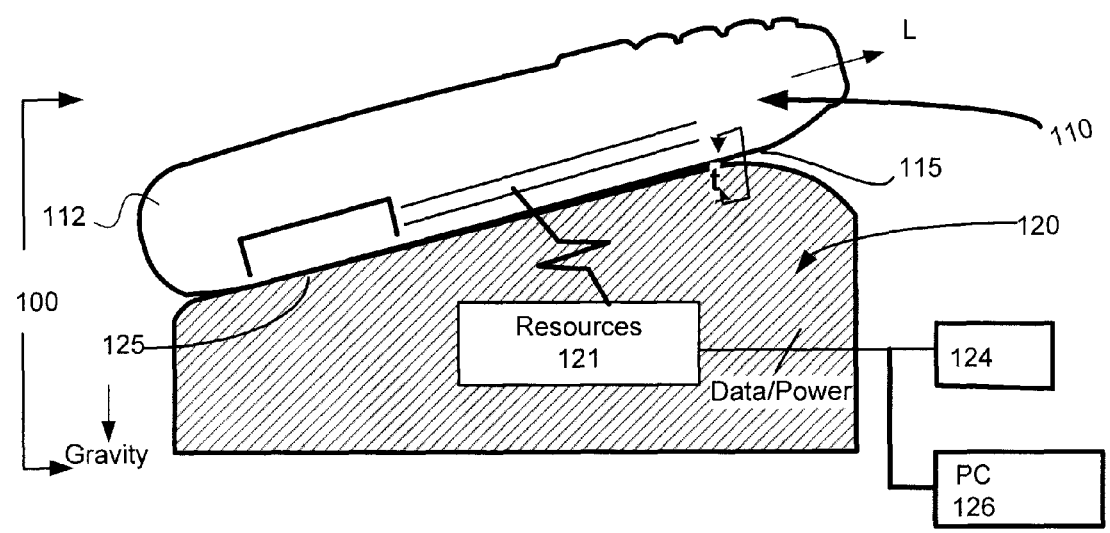
FIG. 1A is a representative diagram illustrating two computing devices that can be inductively linked to provide a power and/or data signal to the other device, according to an embodiment.

Embodiments described herein provide for a computing system, or devices that comprise part of the computing system, in which least two devices inductively exchange power and data. One device is capable of inductively transmitting a power signal to a second device, and to receive feedback from the second device in order to regulate the power signal. Still further, a communication protocol may be established to enable the real-time regulation of the power signal based on power conditions existing on the device receiving the power signal.

Embodiments described herein provide a framework by which two or more computing devices (e.g. mobile computing device and/or docking station) are enabled to transfer power and/or data signals without use of exterior connectors (i.e. is 'connector-less'). Specific implementation scenarios include two computing devices being brought into contact or proximity for purpose of at least one device signaling power and/or data to the other device using a 'connector-less' signal exchange.

According to one embodiment, a mobile computing device ('MCD') and docking station ('dock') are individually equipped with features and components that enable charging/power signals to be communicated from the dock to the MCD without use of connectors. As an addition or an alternative, the dock and/or MCD may exchange or transmit data signals to the other device when the MCD is retained against the dock (i.e. 'docked').

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1A is a representative diagram illustrating two computing devices that can be brought into contact for purpose of enabling one device to provide a power and/or data signal to the other device, according to an embodiment. Numerous embodiments described herein, including an embodiment such as described with FIG. 1, reference a MCD and dock as two devices that are brought into contact with one another for purpose of power/data transfer without use of traditional insertive or mechanically coupled connectors. However, different kinds of devices (e.g. portable devices and accessory devices) may be used with embodiments described herein. In many of the examples provided herein, two devices that are inductively coupled correspond to a mobile computing device (also referred to as an MCD) and an accessory device (specifically a dock or docking station). However, embodiments may also be implemented using other types of devices. In one implementation, the MCD is a multi-purpose device having cellular data and telephonic capabilities, while the accessory device corresponds to, for example, a docking station (for communications and power supply), sticky (or piggy)-back accessory, a light projector, a speaker set, or headset station. As an addition or alternative to cellular telephony/data capabilities, the MCD may include, for example, functionality for use as a media player, a camera or video recorder, a global positioning unit, an ultramobile personal computer, a laptop computer, or a multi-purpose computing device. Numerous other examples and implementations are described herein, including embodiments in which three or more devices are interconnected through one or more connector-less connections.

Accordingly, a system 100 includes a MCD 110 that is supported or otherwise retained by a dock 120. The manner in which the MCD 110 is supported may vary. Moreover, as described with one or more embodiments, the orientation of the MCD on the dock may be changed by the user for purpose of configuring operations or behavior of one or both devices. According to an orientation of an embodiment shown, the MCD 110 is supported on the dock 120 in a partially upright position along its length axis (L). Such an orientation may correspond to a 'portrait' position. In an embodiment in which alternative orientations are possible, one or more 'landscape' positions, or positions in between the portrait and landscape positions may be possible.

According to an embodiment, the dock 120 utilizes physical support structures (not shown), such as shelves, platforms, hooks or mechanical retention features, to retain the MCD 110 in a docked or mated position. In another embodiment, magnetic clasps may be included or provided the dock 120 and/or the MCD 110 to secure retention of the MCD against the dock. Priority U.S. patent application Ser. No. 12/239,656, which is incorporated by reference herein in its entirety, details the use of magnetic clasps and ferrous (or other) material in order to physically retain the MCD 110 in a docked position with the dock 120.

The dock 120 may include resources 121 for generating or extending power and/or data signals to the MCD 110. For example, the dock 120 may be mated with a power outlet 124 or another computer 126 (e.g. desktop computer) to extend power and/or data signals. The resources 121 may include circuitry or hardware, such as AC/DC converters and regulators. In order to enable the dock 120 to receive electrical power from a personal computer or other computing station, one implementation provides for the dock 120 to include a physical connector port, such as provided by a Universal Serial Bus (USB) connector. Additionally, the dock 120 may include data acquisition capabilities, provided through connector ports with the computer 126, wireless ports (e.g. cellular, WiMax connection, Bluetooth), Internet ports, and media feeds (e.g. provided through television tuner and cable).

As shown by an embodiment of FIG. 1, the MCD 110 has a housing shell 112 having a thickness (t). The housing shell 112 may be used to retain internal components of the MCD 110, such as a circuit board, processor, memory, or components of a display assembly. The MCD 110 may be structured so that a primary facade 115 (e.g. the back panel) of the housing shell 112 rests on a receiving surface 125 of the dock 120.

Embodiments described herein provide a system and technique for delivering electrical power over short distances without the use of electrical conductors In one embodiment, the MCD 110 and dock 120 are inductively coupled. The MCD 110 may be placed physically on the dock 120 to inductively couple one or both of a power and data signal. In other embodiments, the MCD 110 and dock 120 may be placed near one another without physical contact.

As an alternative or addition, the MCD may be equipped with orientation sensors such as accelerometers in order for the device to detect its own orientation with reference to gravity. The MCD 110 may include functionality that enables or automatically performs based on its orientation on the dock 120 (e.g. landscape or portrait). In one embodiment, the device communicates its orientation to the dock (e.g. inductively or through wireless (RF) communication medium) so that the dock 120 can facilitate or perform functions that are consistent with the operations the MCD performs in a given orientation. In order to enable the accelerometer (or other sensor) of the MCD to detect its own position, the angle of support provided by the dock 120 may be such that the sensor is operable. For example, some embodiments described herein employ accelerometers, in which case the angle with the horizontal in which the MCD 110 is supported in place is at least 22.5 degrees.

Alternative Housing Implementation and Configuration

While many examples described elsewhere specifically recite implementations in which inductive charging occurs between two devices that are a mobile computing device and dock (or docking station), the recited embodiments may be equally applied between devices that are more generically recited as being either a power supply or power receiving device. Some embodiments recognize that inductive charging can be performed by or with other types of computing devices. For example, rather than use a docking station which supports the mobile computing device in some operable decision, the accessory device can have an alternative form factor that enables it to be carried on the device.

Figure 1B:
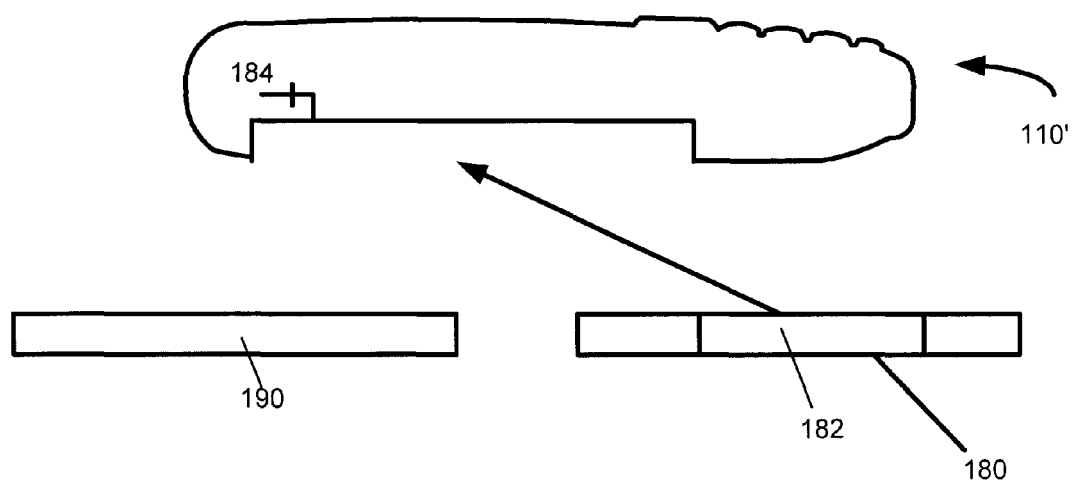
FIG. 1B illustrates a housing segment for a mobile computing device that is modularized to configure the computing device to establish an inductive link with another device, under an embodiment.

Likewise, the mobile computing device can carry inductive charging capabilities as an accessory feature. FIG. 1B, for example, illustrates a housing segment 180 that can be overlaid onto, or assembled in place of an existing housing segment 190 on the mobile computing device 110. The housing segment 180 includes signal handler resources 182 (as described with embodiments of FIG. 7A and elsewhere in this application) for enabling inductive signal transfer with another device. The housing segment 180 may be purchased separately from the MCD 110', and assembled onto the MCD by the user to enable the MCD to have capabilities of inductive charging (power receive), inductive power signaling, and/or inductive data transfer. In one embodiment, the housing segment 180 is a battery cover for the MCD. A data and power bus 184 may interconnect the inductive signaling resources 182 of the housing segment with a battery and other electronic components of the computing device.

In an embodiment in which the MCD 110 is coupled to the dock using magnetic clasps, the exterior surface of the housing segment 180 may include some or all of the ferrous material (or magnets) that device 110 needs to magnetically couple with the dock or accessory. As an alternative, the ferrous material may be provided on other portions of the housing of the MCD, other than the segment 180. For purpose of applications described herein, reference to a mobile computing device with inductive signal receiving/transmitting capabilities may include a device that has its housing accessorized or replaced in part post-manufacturing or sale.

Inductive Signal Path

Figure 2A:
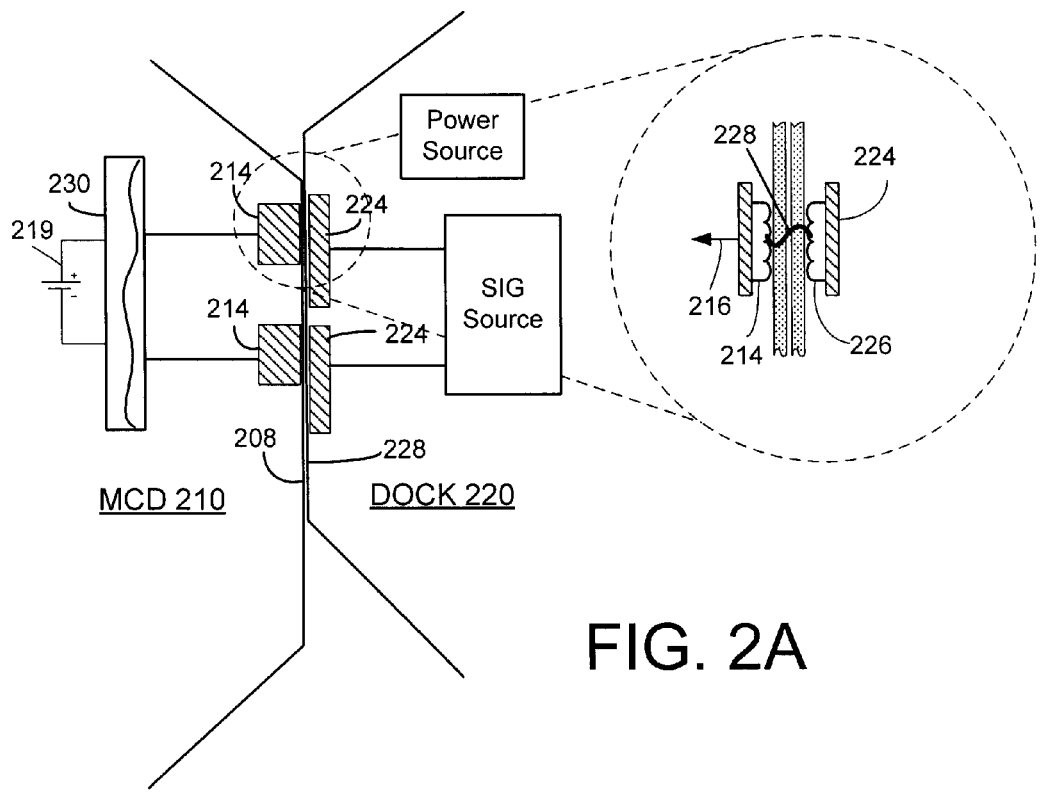
FIG. 2A is a simplified block diagram of two devices that are inductively linked, in accordance with one or more embodiments.

FIG. 2A is a simplified block diagram of a MCD 210 and dock 220, where one or both devices are configured to communicate signals on a signal path that has an inductive signal path portion, so as to form a partially inductive signal path. According to an embodiment, the MCD 210 may be placed in contact with the dock 220, such as in a manner described with other embodiments (such as described with FIG. 1). The result is that a device exterior 208 (e.g. rear facade) comes into contact with a receiving surface 228 of the dock. Alternatively, the two devices may be brought into close proximity, but not necessarily in contact, in order for inductive signal communication to take place. While exterior surfaces 208, 228 of MCD 210 and dock 220 respectively may be in contact as a result of the retention of the MCD by the dock, the contact is not made to conductively transfer signals between the devices. Rather, a signal source 224 on the dock 220 (e.g. such as a power inlet) may generate a signal 228 (e.g. power) that is transformed through a magnetic coil 226 or other inductive mechanism into a magnetic field. A corresponding coil 214 or inductive receiving component may be provided on the MCD 210 to transform the signal 228 into an electrical signal 216. The electrical signal 216 may be treated by various circuit elements 230 and components in order to power components of the MCD 210, and/or to charge a battery module 219 of the device 210.

Figure 2B:
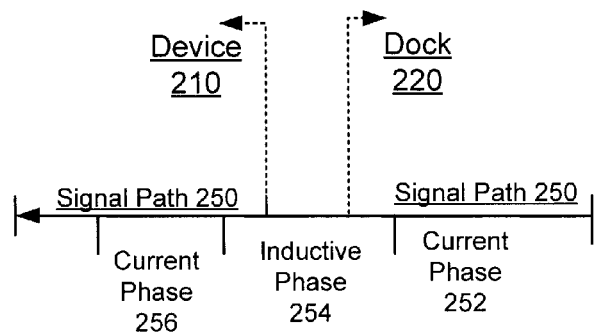
FIG. 2B illustrates an inductive signal path, as extended from or between two devices that are inductively linked, according to one or more embodiments.

FIG. 2B illustrates an inductive signal path 250, as extended from or between the dock 220 to the MCD 210, using a combination of magnetic/inductive and conductive elements provided on both devices. On the dock, the signal path 250 includes a current phase 252 and an inductive (or magnetic field) phase 254. The inductive phase 254 carries the signal across boundaries of respective housings using magnetic field. Thus, on the device 210, the signal path 250 includes an inductive phase 254, followed by a current phase 256. The reverse path may also be possible, such as in the case when the MCD supplies power and/or data to the docking station or another accessory device.

Inductive Coil Arrangements

The inductive conveyance of power and/or data signals may be achieved through use of coils, provided on each device that is to be coupled to transmit or receive such signals. Various coil configurations are possible to enable conveyance of power and/or data, either unidirectionally or bi-directionally.

Figure 3A:
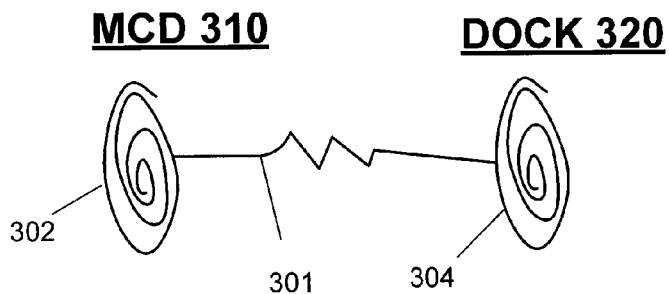
FIG. 3A through FIG. 3C illustrate different coil distribution implementations for inductive signal conveyance, under different embodiments or variations.
Figure 3B:
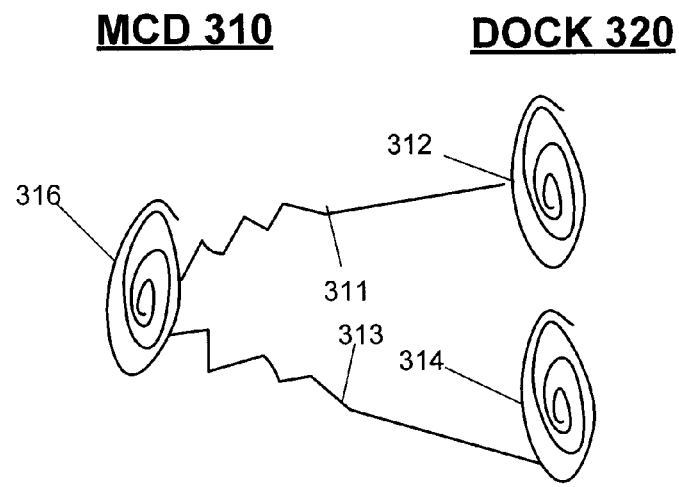
Figure 3C:
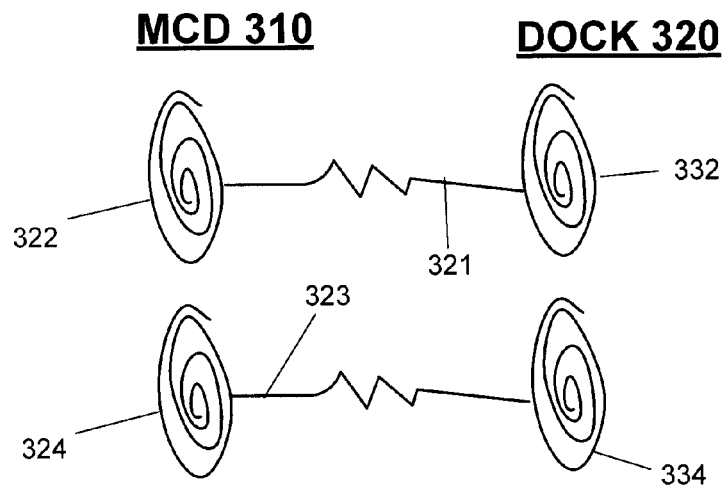

FIG. 3A through FIG. 3C illustrate different coil distribution implementations for inductive signal conveyance, under different embodiments or variations. In particular, FIG. 3A illustrates a system or sub-system that includes two coils, one on each device. The two coils 302, 304 may be used to convey power and/or data in one signal 301 that is exchanged between the two devices. Moreover, the conveyance of either power or data may be bi-directional.

FIG. 3B illustrates a three-coil implementation, where one of the two devices (e.g. the dock 220) includes two coils 312, 314, and the other device (e.g. MCD 210) includes just one coil 316. Such an embodiment may provide the advantage of lessening the weight or size required from the MCD, while enabling separate data and power exchange. In one embodiment, the coil 316 of the MCD 210 receives power 311 from one coil 312 on the dock, and data 313 from the other coil 314. Optionally, either the power 311 or the data 313 signals may be bi-directional, meaning the coil 316 on the MCD 210 may communicate the signals back to the dock 220. In one implementation, the coil on the MCD 210 signals data to the independent data coil on the dock 220.

FIG. 3C illustrates another implementation in which each of the dock 320 and MCD 310 include two coils. In particular, power and data coils 322, 324 on the dock 320 may communicate power 321 and data 323 signals to respective coils 332, 334 on the MCD 310. In an embodiment, the power and data communications are bi-directional.

Computer System Using Inductive Signal Path

Figure 4:
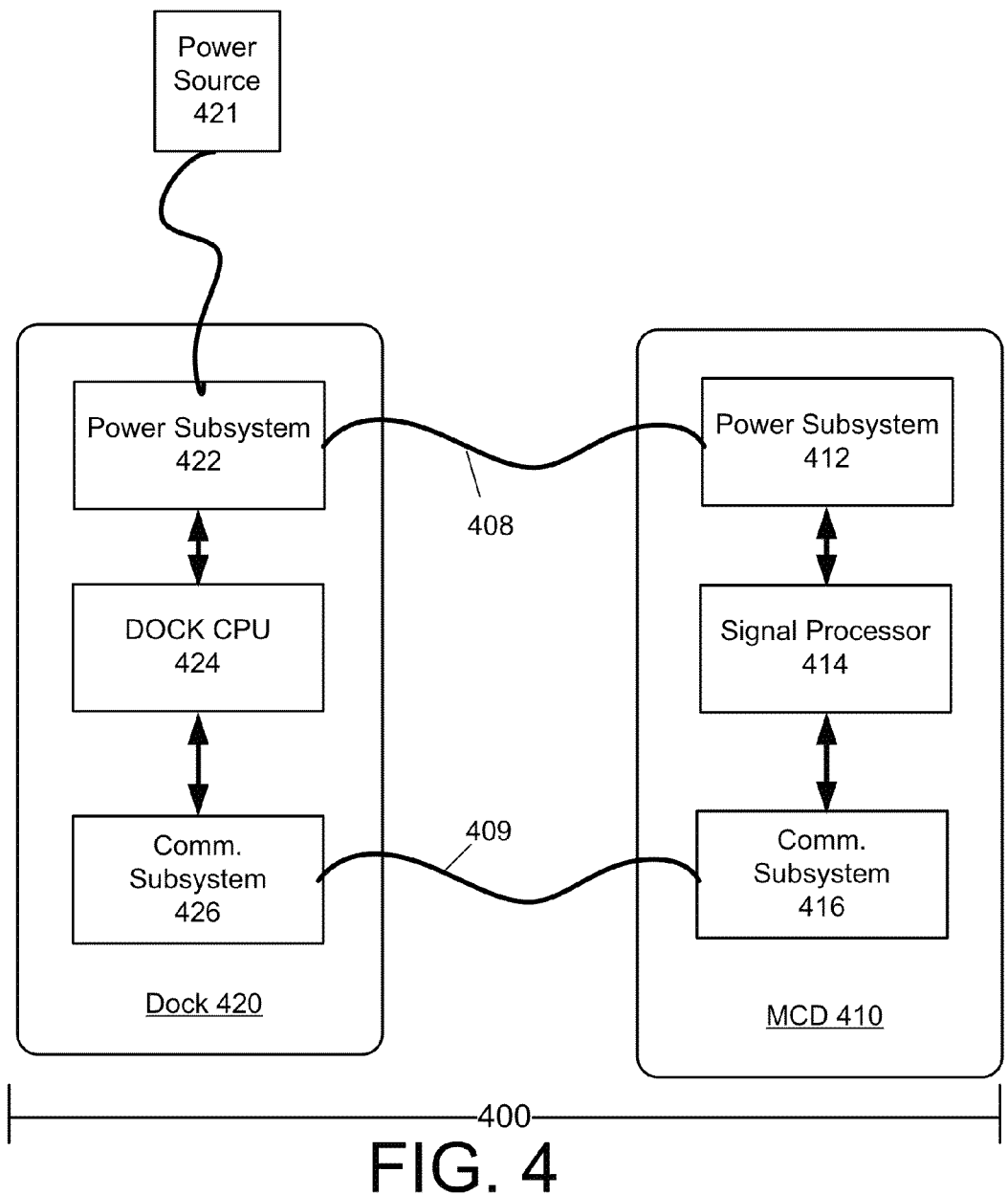
FIG. 4 illustrates a simplified block diagram of a computing system that provides for inductive conveyance of power and/or data signals, under an embodiment.

FIG. 4 illustrates a simplified block diagram of a computing system that provides for inductive conveyance of power and/or data signals, under an embodiment. The computing system 400 includes MCD 410 and dock 420 that are structured to enable inductive signal transfer exchange, in accordance with numerous embodiments described herein. In an embodiment, the dock 420 includes a central processor 424, a power subsystem 422 and a communication subsystem 426. The MCD 410 includes a power subsystem 412, a signal processor 414, and a communication subsystem 416. Additionally, the MCD 410 (and optionally the dock 420) include numerous other components, such as a central processor and memory resources for enabling application executions, cellular and data communications, and numerous other functions that are part of the usage of the MCD 410.

On the dock 420, the power subsystem 422 includes a connection to a continuous power supply 421, such as a wall outlet. Additionally, the power subsystem 422 includes components for converting and regulating the signals from the power supply into a form that is suitable for conveyance using, for example, an inductive medium. Additionally, the power subsystem 422 includes one or more coils for converting an electrical signal originating from the power supply 421 into an inductive signal. The communication subsystem 426 may include wireless or wireline port(s) to receive and send data to other devices, including with other computers or data sources (e.g. media feeds from other devices, such as set-top boxes) or media output devices. In an embodiment, the communication subsystem 426 also enables inductive data handling from data communicated by one of the inductive signal paths that extend between the two devices. As mentioned, such data may be conveyed by either modulating an inductive power signal or using a separate data signal path.

The central processor 424 of the dock 420 may be configured to handle incoming data signals from the communication subsystem 426, whether from the other resource or from the MCD 410. Additionally, the central processor 424 may control data that is communicated out, either to the other resource or to the MCD 410 (using the inductive signal path).

On the MCD 410, an embodiment provides that the power subsystem 412 receives an incoming power signal 408 from the dock 420 and distributes the power signal in modified or regulated form to either other components or to the battery for recharge. The power signal 408 is signaled through an inductive path from the dock 420 to the MCD 410, in a unidirectional fashion. The communication subsystem 416 is configured to communicate with the dock 420 to receive and/or transmit data 409. One embodiment provides that the communication subsystem 416 may include resources to demodulate data carried on the power signal. In particular, the communication subsystem 416 may use its resources to implement one or more protocols, such as (i) a protocol for regulating the inductive delivery of power with exchange of data that communicates current/voltage information (e.g. use levels) on the receiving device, (ii) a credential protocol for retrieving and using credential information (e.g. preliminary data for establishing subsequent wireless communications) from characteristics of modulations in the power signal 408. One or both protocols may further provide for the communication subsystem 416 to switch to, for example, a standardized wireless communication medium (e.g. BLUETOOTH) using the credential information and/or other data communicated by the power signal 408. Still further, another embodiment may provide for the communication subsystem 416 to be enabled to generate modulated power or other signals to communicate to the dock 420 or other device. For example, as shown by FIG. 3B, two coils may be used on the dock, including one coil that communicates both power and data and another that receives data from the MCD 410. The communication subsystem 416 may perform functions of both retrieving data from the modulated data signal and communicating data out to the data receiving coil on the MCD 410.

As described with some other embodiments, data is also combined with the power signal 408 by modulating the power signal. In one implementation, the dock 420 signals data with the power signal 408 as a preliminary step to establishing a different wireless communication relationship. In another embodiment, the data signal 409 may be communicated to or from the MCD separate from the power signal.

Device Block Diagrams

Figure 5:
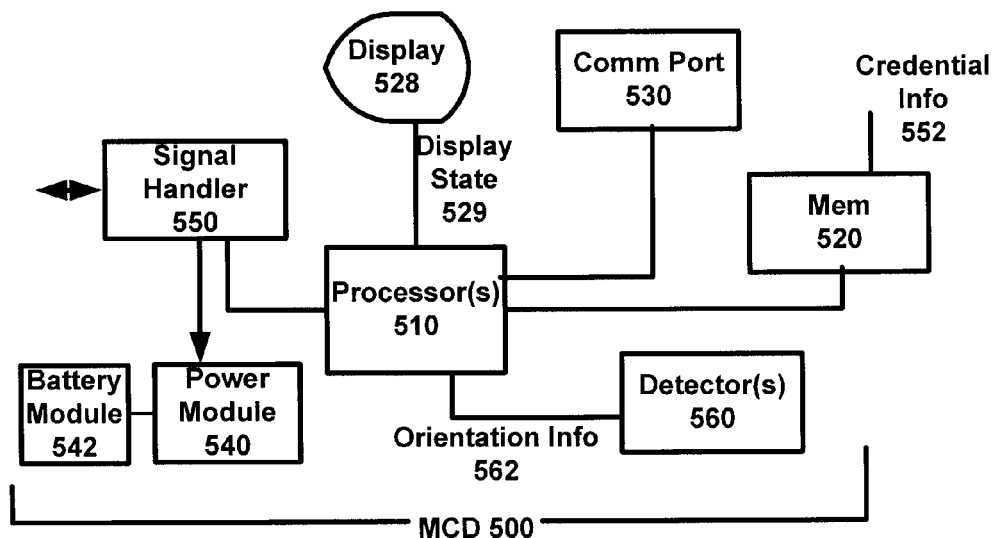
FIG. 5 is a simplified block diagram of a computing device configured in accordance with an embodiment.

FIG. 5 is a simplified block diagram of a MCD, according to an embodiment. A MCD 500 may be configured to include any of the functionalities or capabilities described with other embodiments, including the ability to receive electrical signals (power and/or data) using conductive or inductive signal paths. Thus, as mentioned with other embodiments, the MCD 500 may correspond to, for example, a 'smart phone', a mobile companion, a media player, a digital camera, or a GPS unit (or to a multi-function device that can perform as many of the devices described).

More specifically, one or more embodiments provide that the MCD 500 may correspond to a mobile telephony/data messaging computing device, such as a cellular phone or mobile device with voice-telephony capabilities (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Other examples of functionality that may be provided from the MCD 500 include audio and/or video playback or Global Positioning Services (GPS) as primary or enabled functions. The MCD 500 may have numerous types of input mechanisms and user-interface features, such as keyboards or key-pads, multi-directional or navigation buttons, application or action buttons, and contact or touch-sensitive display screens or buttons. In the case of data messaging/communication devices, specific types of messaging or communications that may be performed includes messaging for email applications, Short Message Service (SMS), Multimedia Message Service (MMS), and proprietary voice exchange applications (such as SKYPE). Still further, the MCD 500 may correspond to numerous other types of computing devices, such as to a notebook computers, an ultra-mobile computer, or a personal digital assistant.

According to an embodiment, the MCD 500 includes one or more processors 510, memory resources 520, a display assembly 528, one or more communication ports 530, and a power module 540. In an embodiment, the MCD 500 includes a signal handler resource 550 (or module), which includes hardware and logic for accepting and/or transmitting power or data signals using an inductive communication medium. As another option, the MCD 500 includes one or more detectors 560 (or sensors) for detecting orientation or position of the MCD 500 when the device is docked to the accessory device.

The processor 510 may include or communicate with the signal handling resource 550 to enable some or all of the signal handling capabilities for enabling inductive receipt or transmission of signals. The communication ports 530 may include wireless or wireline ports. Wireless communication ports may be implemented through, for example, local wireless communication protocols such as provided by BLUETOOTH standards, Wireless Fidelity (802.11(b) or (g)). The wireless communication ports may also communicate over a cellular network. More specifically, the MCD 500 may include one or more wireless communication ports to provide wireless connectivity of a particular type (or types) for purpose of carrying out any one or more types of wireless operations. For example, the communication port 530 may include or correspond to (i) a Wide Area Network (WAN) radio module for sending and receiving cellular voice/data, (ii) a local wireless communication port such as Bluetooth or wireless USB, (iii) an infrared port, (iv) a Global Positioning System radio, and/or (v) a WiMAX radio.

The memory resources 520 may, for example, include Flash memory, Random Access Memory, and/or persistent memory (i.e. ROM). The memory resources 520 include instructions and data for implementing functionality and programmatic actions such as provided with any of the embodiments described. Optionally, the memory resources 520 may carry databases or data stores of records that contain active data items (such as described above) for synchronization or communication with a primary computer, and/or enable actions on such data items of saving the data items.

According to an embodiment, the signal handler resource 550 includes hardware for receiving or transmitting a power signal and/or a data signal (either modulated or combined as one signal) to and/or from the dock. Additional details of components and elements for signal handler resource 550 to enable an inductive signal path is detailed with various embodiments described above. In one embodiment, the signal handler resource 550 is configured to receive a power signal for purpose of either powering other components (e.g. display assembly 528) of the MCD 500, or to recharge the battery of the power module 540. In one implementation, the incoming power signal may be treated using circuits and components that are separate from a central processor of the MCD 500. Thus, processor 510 may include more than one unit or resource. In one implementation, for example, the MCD 500 includes both a signal processor (which may be incorporated with the signal handler 550) and a central processing unit (CPU).

As described elsewhere, an embodiment provides that the MCD is configured to use the signal handler resource 550 to convey and/or receive some data that enables subsequent communications between the devices. This data may include credential data 552, which enable subsequent wireless communications using, for example, a local wireless communication link via one of the local wireless communication ports 530. The credential data 552 may be stored within a portion of the memory resources and made available to the processing resources for inclusion or use with functions performed by the signal handling resource 550. In one embodiment, the signal handling resource 550 is capable of inductively communicating at least some of the credential data through a modulated power signal. As an addition or variation, the signal handling resource 550 is capable of recognizing or using the credential data 552, inductively communicated from the dock, to identify and pair with the dock.

In one embodiment, the detectors 560 are provided in the form of sensors that independently detect the orientation of the MCD 500. For example, the detectors 560 may correspond to accelerometers or vertical position sensors that detect the orientation of the MCD 500 at any given instance. In another embodiment, the detectors 560 sense or communicate data or signals to electrical or conductive (or inductive) pads that are positioned on an exposed surface of the dock. Thus, the position of the MCD may be detected by determining which detectors 560 and/or sensors or conductive pads are in contact when the two devices are docked.

Information identifying the orientation of the MCD 500 when docked may affect various operations or modes/states of the MCD and/or its components. The detectors 560 may signal or communicate the orientation information 562 to the processor 510 of the MCD. In one implementation, for example, the processor 510 is configured to use the orientation information 562 to signal a display state 529 to the display assembly 528. The display assembly 528 may, for example, be switched between portrait and landscape mode in response to the signal.

Figure 6:
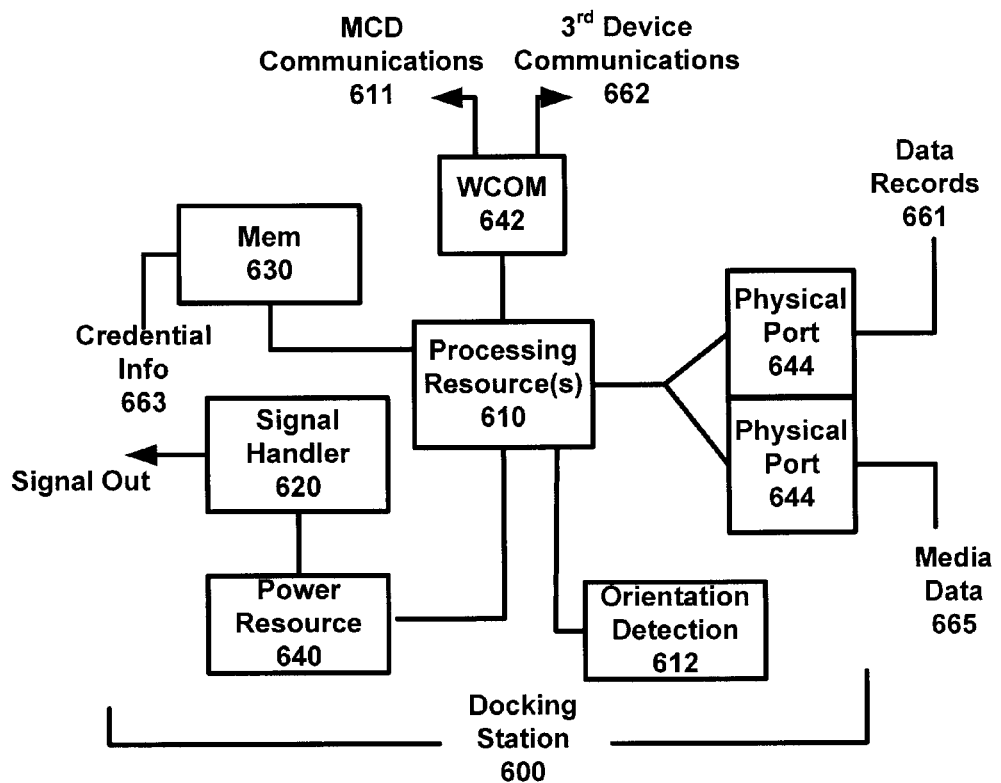
FIG. 6 is a simplified block diagram of a docking station, configured in accordance with an embodiment.

FIG. 6 is a simplified block diagram of a dock, under an embodiment. The dock 600 may correspond to any of the docks described with other embodiments herein. In particular, a dock as described may be used to implement (depending on the embodiment) an inductive signal path for communicating power and data with a MCD such as described with FIG. 6. In an embodiment, the dock 600 includes processing resources 610, a signal handler 620, memory resources 630, and a power resource 640. The dock 600 may also include one or more communication ports, including a wireless communication port 642 and/or one or more wireline communication ports 644.

The processing resources 610 enables intelligent operations, such as authenticating or pairing with the MCD 500 (see FIG. 5) (e.g. over a wireless link) and/or data sharing/synchronization operations (with MCD 500). In one variation, the dock 600 is also capable of interfacing with a computing resource (e.g. other device or computer) to enable synchronization or data sharing operations between the MCD 500 and third device, or between the dock and the third device. In an embodiment, the processing resources 610 correspond to or include a signal processor which is able to receive or transmit data through modulations in the power signal.

The signal handler 620 includes circuits and elements for enabling an inductive coupling with corresponding elements residing within a panel or housing of the MCD. The signal handler 620 may include one or more coils for transmitting and/or receiving power or data. As described, the power signal communicated through the magnetic coil may optionally be modulated in a manner that carries or communicates data. Thus, the signal handler 620 may communicate or receive data using a power signal carried over an inductive signal path.

The power resource 640 handles power received through a standard outlet. As an alternative or addition, the power resource 640 may draw power from another computing device. Still further, the power resource 640 may include batteries that provide power for the dock and other devices.

The wireless communication ports 642 may be provided in the form of a standardized port, such as defined by the BLUETOOTH or WIRELESS USB standards. The physical ports may also be standardized, such as provided by USB or FIREWIRE standards.

Optionally, the dock 600 includes an orientation detection mechanism 612 that may detect the orientation of the MCD in the docked position. As an addition or alternative, the orientation detection mechanism 612 detects whether the MCD is present (i.e. docked). As described with other embodiments, the orientation detection mechanism 612 may use information that is indicative of the orientation of the MCD in the docked position to perform or configure a state or mode or operation. Alternatively, the dock 600 may communicate the orientation information to the MCD.

Among possible functions that the dock may perform, the dock may send or receive wireless communications 611 with the MCD. Such communications may accomplish various tasks or operations, including (i) synchronization or communication of data files or records 661 (e.g. synchronize contacts and emails), (ii) establish a paired relationship with the MCD for subsequent operations using credential information 663 and device communications 662, (iii) establish a paired relationship between the MCD and a third computing device connected to the dock (e.g. enable BLUETOOTH or wireline communication with attached personal computer), (iv) serve as a pass-through or data interface with another device (e.g. television of display screen) by forwarding communications 662 to a third computer (e.g. personal computer or laptop), and/or (iv) exchange of data to share or provide resources or extend functionality of the MCD (e.g. enable playback of media data 665 residing on the device by routing audio to speakers connected to dock).

One primary purpose that the dock 600 may serve is to recharge or power the MCD using power communicated through the signal handler 620. Still further, an embodiment provides that the dock 600 detects an orientation of the MCD and then communicates the orientation information to the MCD.

While an embodiment of FIG. 6 is descriptive of an accessory device that corresponds to a dock, it should be apparent that other forms of accessory devices may include similar components or functions. For example, an accessory device may be provided in the form of a "sticky-back" device. Such a device may use, for example, the signal handler 620 to conductively or inductively receive power or data. Such a device may also perform wireless communications with the MCD to synchronize records, perform media playback and/or otherwise share other forms of data (e.g. provide GPS data, receive images etc.)

Thus, with the examples recited, an embodiment provide that the MCD 500 may be configured to (i) receive power from an accessory device, such as a dock 600, and/or (ii) perform wireless communications with the accessory device (i.e. dock 600 or other device) using a local wireless communication port. As an addition, the MCD may use the power signal or the connector-less medium to exchange and perform programmatically at least some of the steps to authenticate or authorize the wireless pairing and communication. In some cases when, for example, the accessory device requires power, the MCD may supply the power using an inductive signal transfer.

Signal Handler on MCD

Figure 7A:
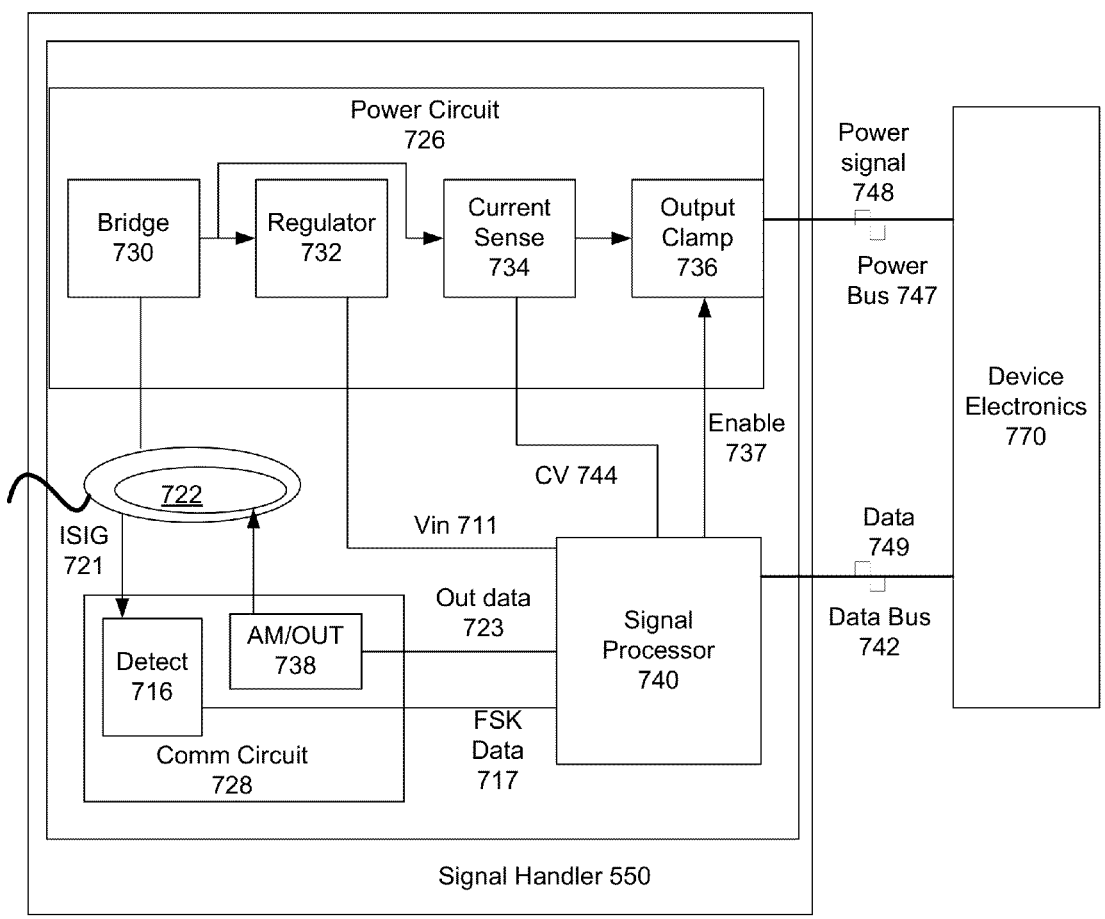
FIG. 7A is a simplified block diagram of a mobile computing device having components for implementing an inductive signal transfer system in combination with another device, according to an embodiment.

FIG. 7A is a simplified block diagram of a mobile computing device (such as described with FIG. 5) having components for implementing an inductive signal transfer system in combination with another device (e.g. a dock such as described with FIG. 6), according to an embodiment. In FIG. 7A, signal handing resource 550 is shown to comprise various components to inductively receive and/or communicate power/data with another device. More specifically, the signal handling resource 550 includes one or more coils 722 that form a terminal of a corresponding inductive signal path. Additionally, the signal handling resource 550 includes communication circuits 728, power circuits 726 and a signal processor 740 (CPU or processing resources) for handling incoming and outgoing signals using the inductive signal path. The processor 740 is programmed to implement a protocol for controlled use of power and exchange of data across the inductive link. More specifically, signal processor 740 (i) implements a protocol by which data may be communicated and/or interpreted through the inductive signal path, enabled in part through the coil 722; and (ii) controls receiving/communicating power. To this end, it may enable power circuits 726 which treat the incoming signal path. The signal processor 740 is powered by voltage 711 received from the coil 722 via a regulator 732. In one implementation, the regulator supplies 732 supplies 3 volts to the processor 740. The signal processor 740 also monitors current (current value 744) to detect current levels of the power signal received over the coil 722. The power circuits 726 supply power signal 748 across a power bus 747 to device electronics 770. In this way, the power signal 748 power the components of the device 500 independently. The power signal 748 may also recharge the battery of the device.

According to some embodiments, signal processor 740 signals data 749 across data bus 742 to exchange data with another processing resource (e.g. CPU) of the device. This data may correspond to, for example, credential information, or the information regarding data received from the dock (e.g. confirmation of credential information exchange).

Additionally, the MCD 500 may be configured to combine detectors (such as sensors) for detecting external objects (i.e. the dock) as a mechanism to detect information about the dock.

According to one or more embodiments, the power circuits 726 include a synchronous bridge 730, the regulator 732, current sense 734, and output clamp 736. The coil 722 receives an incoming inductive signal 721 from the dock 600 (see FIG. 6) or other accessory device. The synchronous bridge 730 outputs unregulated DC signal to both regulator 732 and current sense 734. As mentioned, one implementation provides that the regulator 732 is a 3-volt regulator, so as to supply a 3-volt power signal to the signal processor 740. The current sense 734 signals current values 744 to the processor 740, which switches on or off the output clamp 736. More specifically, in instances when the supplied inductive signal 721 exceeds desired power levels, the output clamp operates 736 (with enable signal 737 from the processor 740) to turn on and clamp off the over-voltage. The output clamp 736 may act as a voltage regulator or "buck" converter. In this way, the output clamp 736 ensures an output (to power the device 500 or recharge its batteries) is regulated. Thus, in instances when the incoming inductive signal 721 is too high, the signal handler can regulate the voltage to the device electronics.

As mentioned, the incoming signal 721 may be modulated to carry data with delivery of power. The communication circuit 728 (portions of which may be distributed or integrated with the processor or elsewhere) may include a Frequency Shift Key (FSK) detector 716 to detect the signal modulation of the incoming signal 721 over a given duration. FSK modulation is just one type of modulation that can be implemented for the device. For example, the detector may be used to handle AM signal modulation, phase modulation, QAM, CDMA, pole position or various other forms of signal modulation. Such FSK modulation may be consistent with one or more protocols recited herein. Incoming data 717, as detected from the detector is communicated to the processor 740. Incoming data 717 may include protocol data (data to initiate a sequence of protocol events to control power supplied from dock 600 to the MCD 500), or credential or usage data. The processor 740 may communicate some data from the incoming signal 721 over the data bus 742 to the device (e.g. the device's CPU). Other data may be handled to determine protocol responses, or provide/use feedback to tune the characteristics of the power signal 721. The processor 740 may signal data out across the inductive channel using AM modulation (or alternatively FM modulation). In one embodiment, the same coil 722 is used to transmit data out and receive data in on the MCD 500. More specifically, the data out may correspond to protocol data which (i) responds to protocol events, such as signals communicated from the dock 600; (ii) provide feedback, including power supply information (e.g. how much power is needed) or other data to enable the controlled regulation of the incoming power signal 721.

Figure 7B:
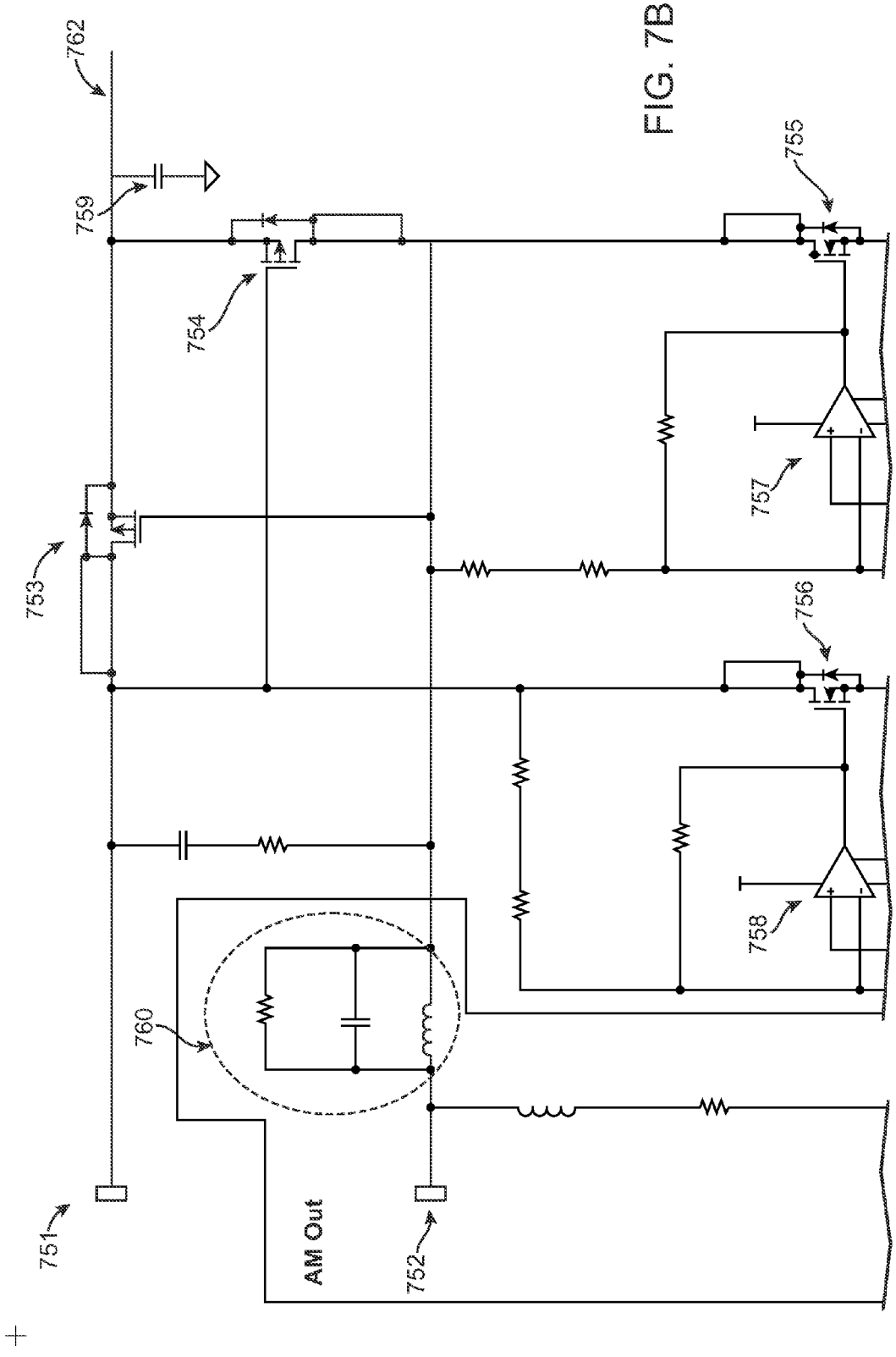
FIG. 7B is a circuit-level diagram illustrating exemplary circuit configurations of a portion of the system shown in FIG. 7A.

FIG. 7B is a circuit-level diagram illustrating exemplary circuit configurations of a portion of the system shown in FIG. 7A. Circuit elements in FIG. 7B include input/output (I/O) ports 751 and 752, transistor diode pairs 753, 754, 755, and 756, Op Amps 757 and 758, smoothing capacitor 759, decoupling elements 760, output data signal line 761, DC power line 762. I/O ports 751 and 752 may represent coils which may be inductively coupled to receive and transmit data and power. I/O ports 751 and 752 may represent a single inductively-coupled coil, such as coil 722 of FIG. 7A. I/O ports 751 and 752 receive AC signals through inductive coupling. The received AC signals include at least one of a power component and a data component. The power component of the received AC signal is converted to a DC power signal using a synchronous bridge or rectifier formed by diodes 753, 754, 755, and 756. The synchronous bridge corresponds to the synchronous bridge 730 of FIG. 7A. A half-synchronous bridge may alternatively be used.

In each of the transistor diode pairs 753, 754, 755, and 756, a transistor (typically MOSFET) is connected in series with a diode to eliminate voltage drop across the diode when the diode is forward-biased. In transistor diode pairs 755 and 756, the gates of the transistors are controlled by Op Amps 757 and 758, respectively. Op Amp 757 is configured and coupled to output a voltage level to turn on the transistor of transistor diode pair 755 when the diode of transistor diode pair 755 becomes forward-biased. Op Amp 758 is similarly configured to perform the same function on transistor diode pair 756. Transistors of transistor diode pairs 753 and 754 are controlled by voltages through I/O ports 751 and 752, respectively. Smoothing capacitor 759 is coupled to the synchronous bridge to reduce oscillations of the output of the synchronous bridge, DC power line 762. The smoothing capacitor capacitively loads the DC power line 762 so that a smooth DC power output may be achieved. Decoupling elements 760 comprises capacitors, resistors and inductors coupled to decouple circuitry to convert AC power to DC power (synchronous bridge) and output data signal line 761. Output data signal line 761 transmits output data from circuitry within the device to I/O port 752. According to at least one embodiment, output data is a modulated signal.

Figure 8:
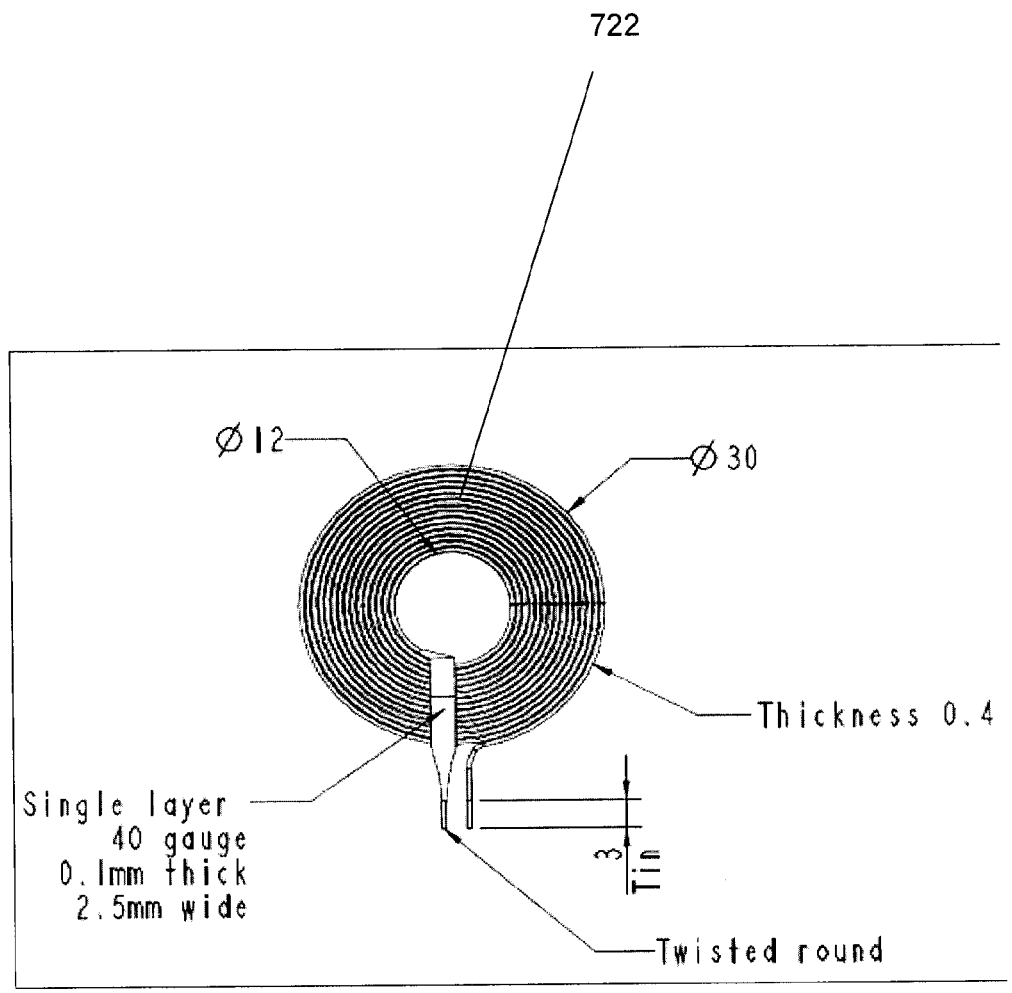
FIG. 8 illustrates details for a magnetic coil that can be used on a computing device, in accordance with one or more embodiments.

FIG. 8 illustrates details for a magnetic coil 722 (FIG. 7A) that can be used on the MCD 500, in accordance with one or more embodiments. In one implementation, the coil 722 includes 16 turns of 24 strands of 40 Gauge insulated Oxygen free copper, with all 24 strands wound simultaneously on a 12 mm diameter core. The coil is backed by material that provides an inductive shield, so as to protect the device electronics and circuits from the magnetic field used to transmit signals onto the device. In one embodiment, a layer of Finemet material is used as backing for the coil 722 to provide a magnetic flux conduit.

Signal Handler on MCD

Figure 9A:
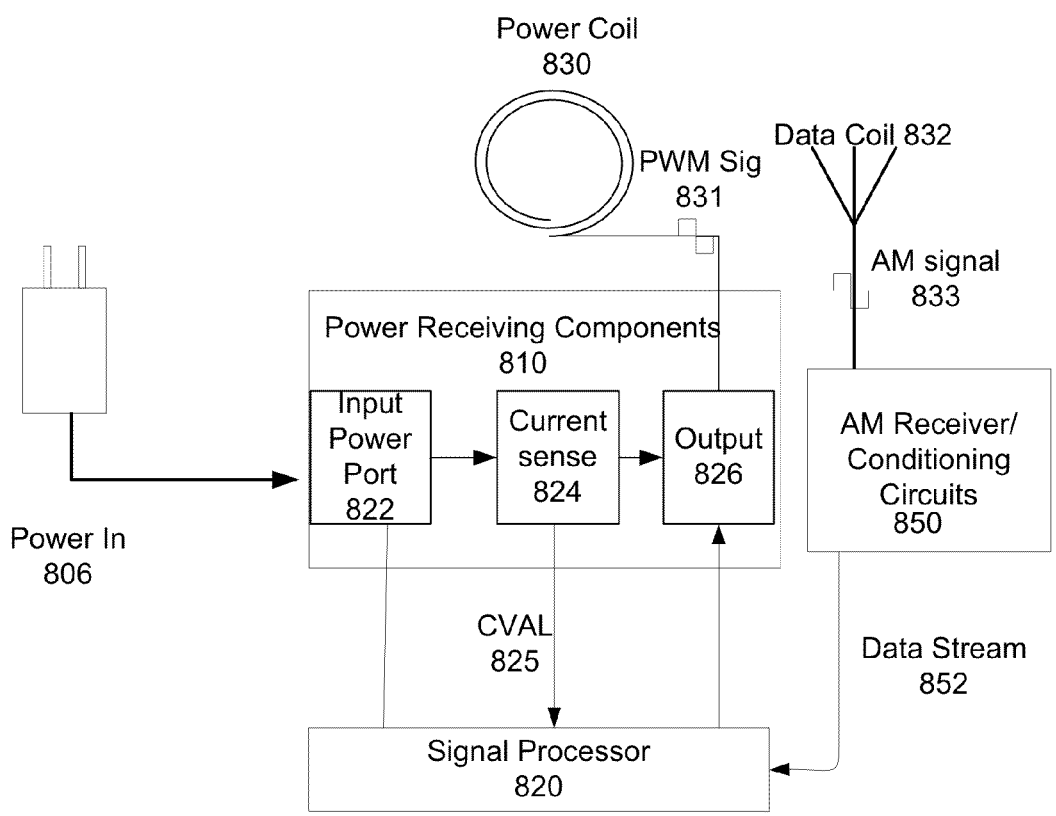
FIG. 9A is a simplified block diagram of a docking station (or other accessory device) having components for implementing an inductive signal transfer system in combination with another device, according to an embodiment.

FIG. 9A is a simplified block diagram of a docking station (or other accessory device) having components for implementing an inductive signal transfer system in combination with another device (e.g. a MCD such as described with FIG. 5), according to an embodiment. In one embodiment, the signal handler 620 (FIG. 6) of dock 600 (FIG. 6) includes power receiving components 810 to receive power 806 from an external source 802, a signal processor 820, a power coil 830, a communication coil 832, and a receiver 850. In one implementation, the power receiving components 810 include a connector port 822 that corresponds to, for example, a USB type connector port (e.g. Micro-USB port). The processor 820 communicate with the connector port 822 to detect the type of power source that is being used. In the implementation shown, the connector port 822 is of a USB type, the connector port 822 is able to distinguish when the connecting device is another computing computer or an electrical outlet adapter (by detecting when the data signal lines D+ and D− are shorted). In addition, the processor 820 communicates with the current sense 824 in order to detect the current levels of the incoming power supply. Specifically, the connector port 822 signals input power to a current sense 824. The current sense 824 detects the current levels and signals a current value 825 to the processor 820. In this way, the processor is able to control the input power supply to the dock 600 (FIG. 6) to ensure current/power levels are adequate. In one implementation, a minimum of 1 ampere is needed as the current supply from the external source.

The power receiving components 810 include an output section 826 which generates a power signal that drives the power coil 830 to inductively signal PWM signal 831 to the MCD 500 (FIG. 5). The output section 826 thus includes circuitry to modulate the power signal from the power source. As described elsewhere, the modulation may be in form of Frequency Shift Keying (FSK) to communicate commands, responses and/or acknowledgements to the MCD consistent with a communication protocol such as described with one or more embodiments described herein. The logic for determining the specific commands are data bits originals from the processor 820, which communicates with the output section 826. In one implementation the modulation frequency (as provided by the output section 826) is 125 KHz and used to communicate data using "1" and "0" values that correspond to signal peaks. As described previously, MCD 500 (see FIG. 5) may be equipped to inductively receive the transmissions from the power coil 830.

The dock 600 uses the communication coil 832 to receive inbound data signals transmitted over the inductive channel. In one embodiment, the communication back from the MCD 500 is provided by an On-Off Key (OOK) 3 MHz signal (shown as AM frequency inductive signal 833) that is superimposed on the power signal. This signal is detected separately by data coil 832, which is positioned so it does not couple too strongly with the primary power coil 830, as this could adversely attenuate the signal. In one implementation, the communication coil 832 is a six-turn coil positioned sufficiently apart from power coil 830. The data coil 832 forms part of a tuned circuit, which discriminates the 3 MHz signal from the 125 KHz power drive. The MCD 500 signals protocol data (such as responses, power requirements, data for establishing credentials, licenses, state information etc.) to the communication coil 832 of the dock 600 as an AM frequency inductive signal 833. The AM receiver 850 receives and converts the inductive signal 833 into a data stream 852 that is communicated to the processor 820. The processor 820 uses the data stream 852 to control the power output via the power coil 830, in a manner described with embodiments such as described with FIG. 12 and FIG. 13.

Figure 9B:
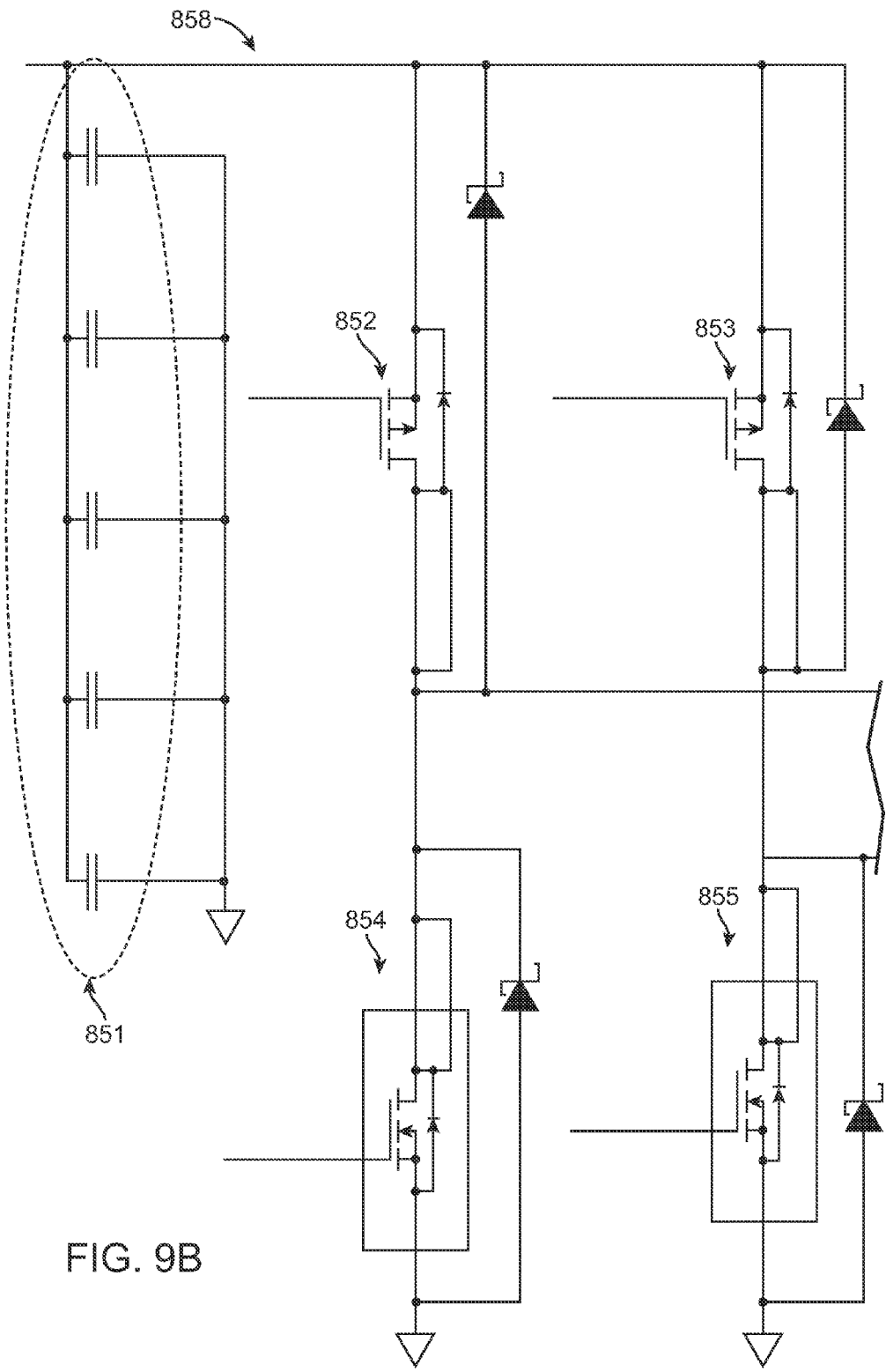
FIG. 9B is a circuit-level diagram illustrating a suitable circuit configuration of output circuitry of a docking station, as described by FIG. 9A, under an embodiment.
Figure 9B:
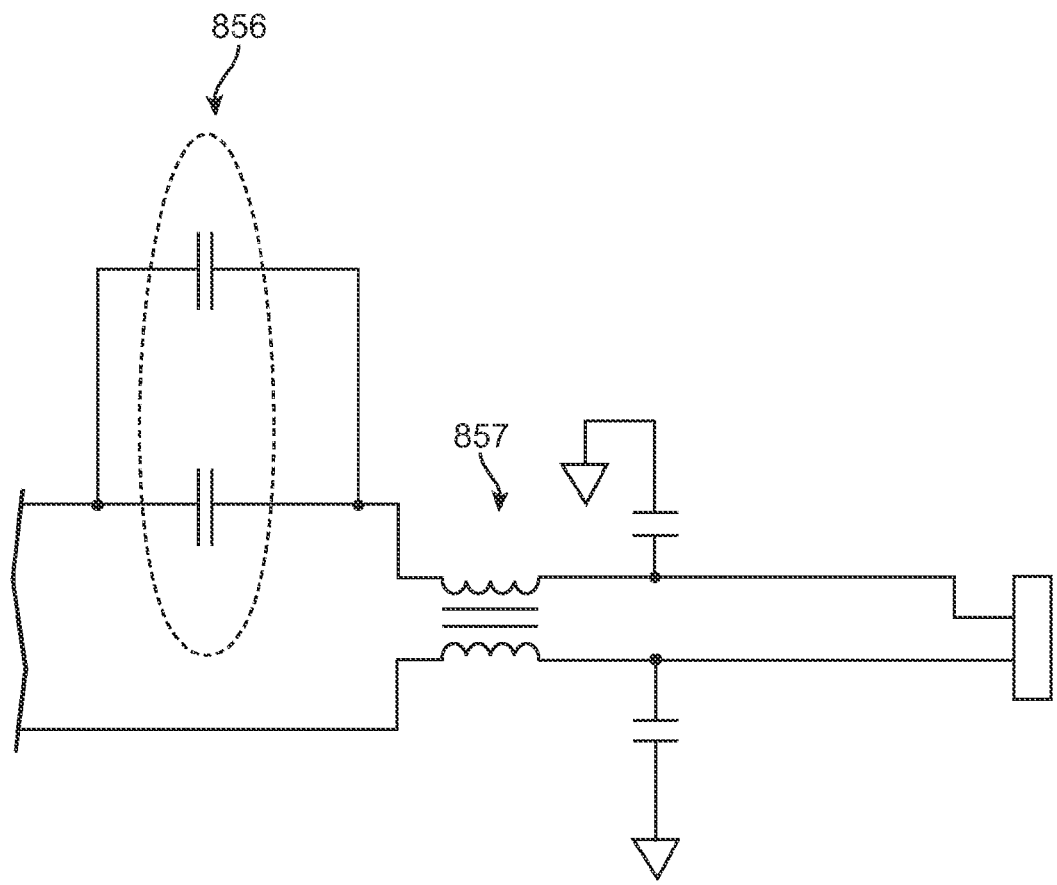

FIG. 9B is a circuit-level diagram illustrating an exemplary circuit configuration of output circuitry 826 of FIG. 9A. Output circuitry includes capacitor bank 851, transistors 852, 853, 854 and 855, output capacitor 856, choke 857, and DC power line 858. As described with an embodiment of FIG. 11, the transistors 852, 853, 854 and 855 form an H Bridge for the dock (or power supply device) that can be driven to increase or regulate power output. Capacitor bank 851 is coupled to the DC power line 858. DC power line 858 is further coupled to terminals of transistors 852 and 853, which together with transistors 854 and 855, form an H-bridge which is well-known. The H-bridge operates to convert DC power transferred via DC power line 858 to AC power. Capacitor bank 851 has equivalent capacitance large enough to prevent significant voltage oscillations on the DC power line 858. According to one embodiment, gates of transistors 852, 853, 854, and 855 are controlled by a microcontroller.

Output capacitor 856 is coupled, on one end, to terminals of transistors 852 and 853. Another end of the output capacitor 856 is coupled to the choke 857. According to one embodiment, the output capacitor's 856 capacitance value is designed such that when coil 830 of FIG. 9A is inductively coupled to a receiving coil, the frequency of the output AC power signal is at the desired frequency. According to one embodiment, the frequency of the output AC power signal is 120 kHz when coil 830 is inductively coupled. According to one embodiment, the frequency of the output AC signal when coil 830 is coupled is 90 kHz.

Output capacitor 856 is designed to have minimal resistance to the desired output AC power signal. According to one embodiment, two capacitors are connected in parallel to form output capacitor 856. One of the two capacitors is a metalized polypropylene film capacitor, which has very low loss characteristics. The other of the two capacitors is an adjustment capacitor which may be polycarbonate film capacitors. The adjustment capacitor has a capacitance value which causes the overall capacitance of the output capacitor to be a desired capacitance value. Choke 857 is an inductor with an inductance value tuned to block out unwanted asymmetric switching transient signal components from the output AC power signal.

Figure 9C:
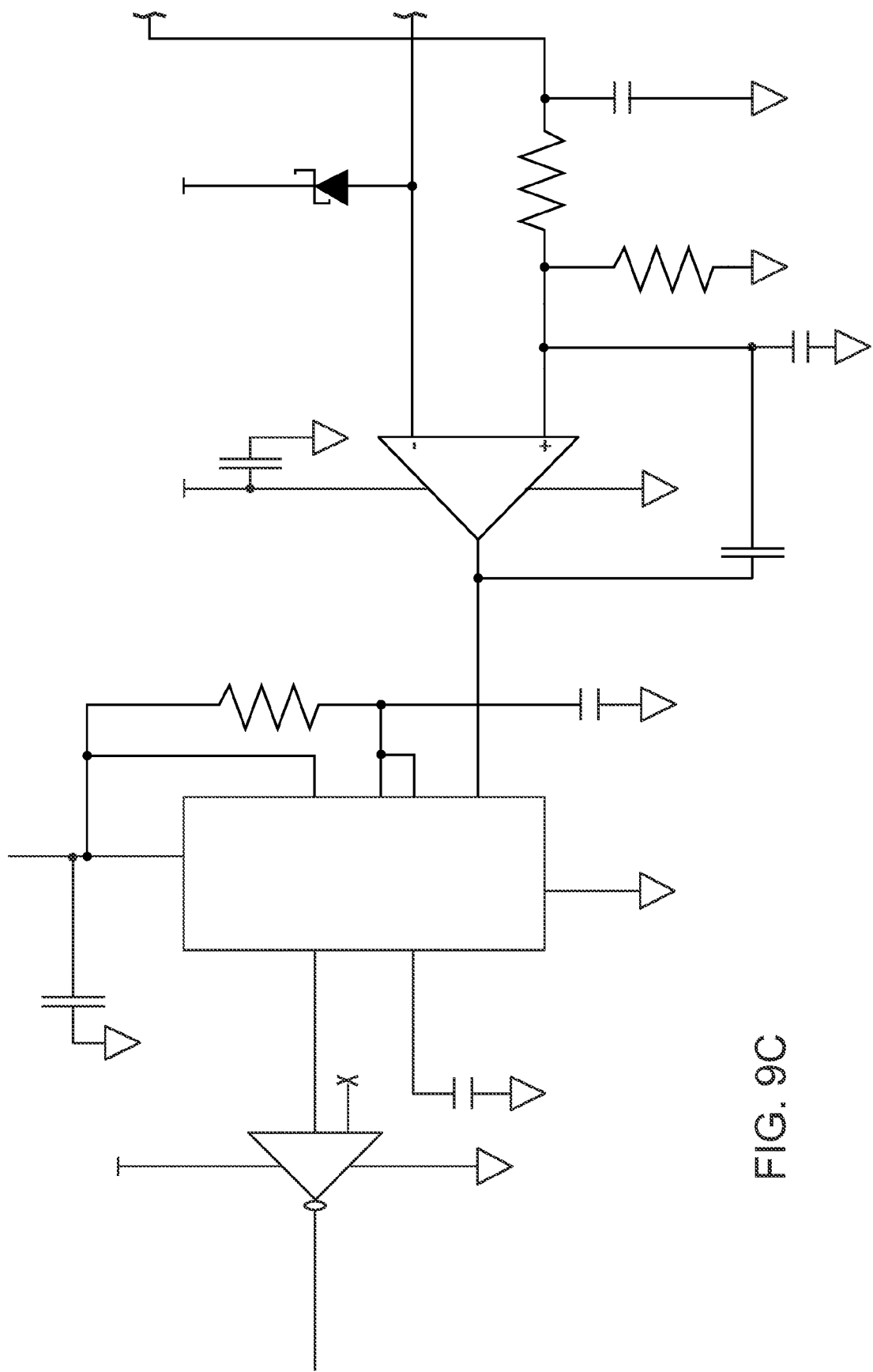
FIG. 9C is a circuit-level diagram depicting a suitable circuit configuration for an inductive receiver on a docking, under an embodiment.
Figure 9C:
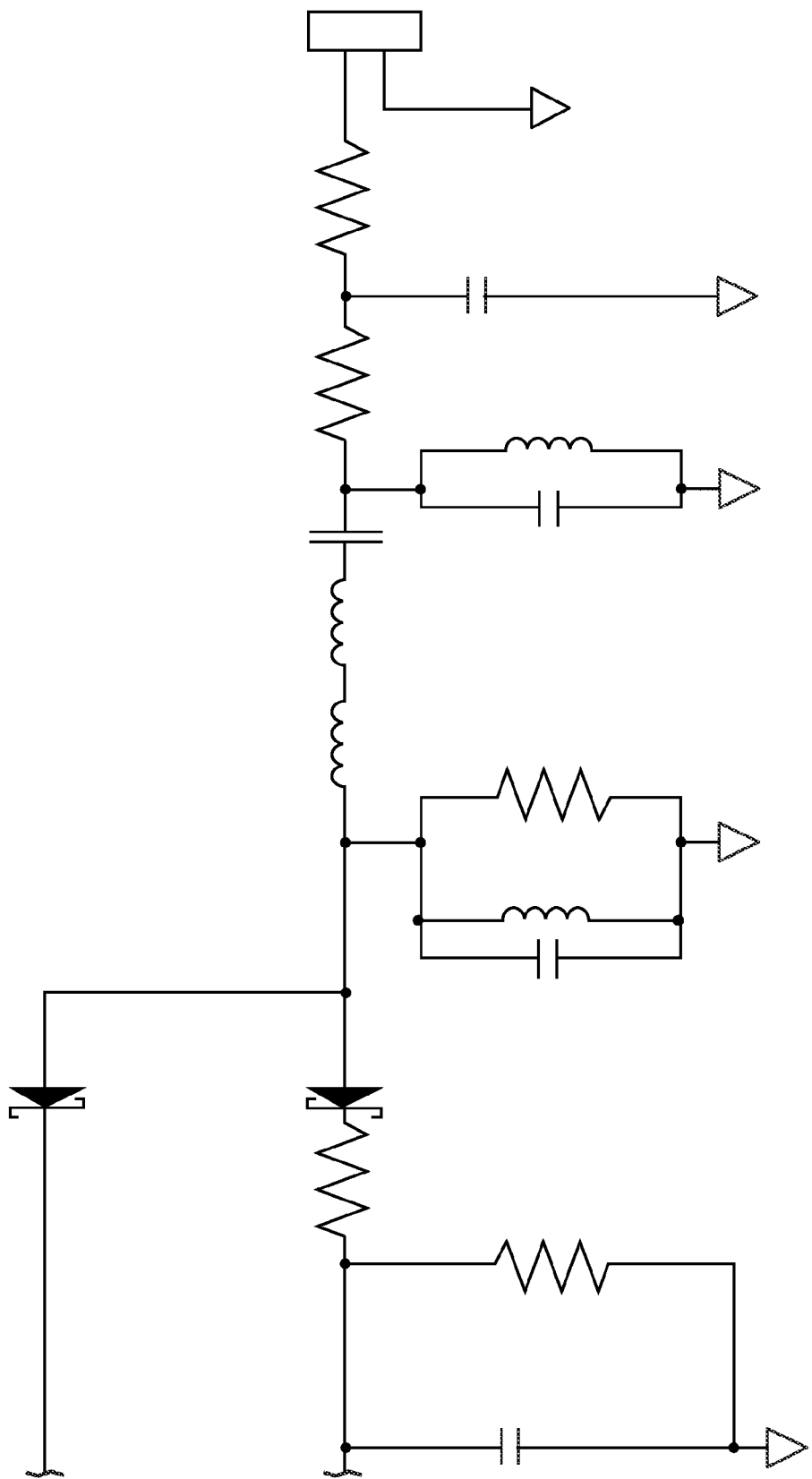

FIG. 9C is a circuit-level diagram illustrating an exemplary circuit configuration of AM Receiver/Conditioning Circuits 850 of FIG. 9A. AM Receiver 850 includes Schottky Diode 861, comparator 862, diode 863, timer circuit 864, inverter 865, and input 866. AM receiver is coupled to receive modulated data signal from coil 832 of FIG. 9A. Received modulated data signal occupies a different frequency range than output signal transmitted from coil 830. According to one embodiment, received modulated data signal has a center frequency of 3 MHz. Coil 832 is positioned in relation to coil 830 to minimize, as much as possible, inductive coupling between the two coils in order to prevent attenuation to the received modulated data signal. According to one embodiment, coil 832 is a 6-turn coil positioned on the side of the top surface of the dock. The received modulated data signal received at input 866 which is coupled to coil 840. The received modulated data signal is then transmitted to Schottky diode 861 and diode 863. Schottky diode 861 generates low frequency signal derived from the amplitude of the received modulated data signal. This low frequency signal is compared with an averaged voltage level generated by diode 863, in conjunction with attached resistive and capacitive circuit elements. The comparison is performed by comparator 862 and the output of the comparator is a demodulated data signal. Before the demodulated data signal is transmitted to the signal processor 820, it is transmitted to a timer circuit 864 and then an inverter in order to adjust the demodulated data signal's timing and voltage levels.

FIG. 9D and FIG. 9E illustrate a coil assembly or sub-assembly for use on one or both devices, under another embodiment. In one embodiment, a two-coil sub-assembly may be implemented on the dock 600 (See FIG. 6), for use in inductive signal transfer to the MCD 500 (See FIG. 5). As shown, the sub-assembly includes a ferrite core 950 having mounted therein a power coil 952. A data coil 954 'floats' on an inner surface of a housing on which the device is received. The ferrite core 950 extends through a center of the power coil 952.

Figure 7B:
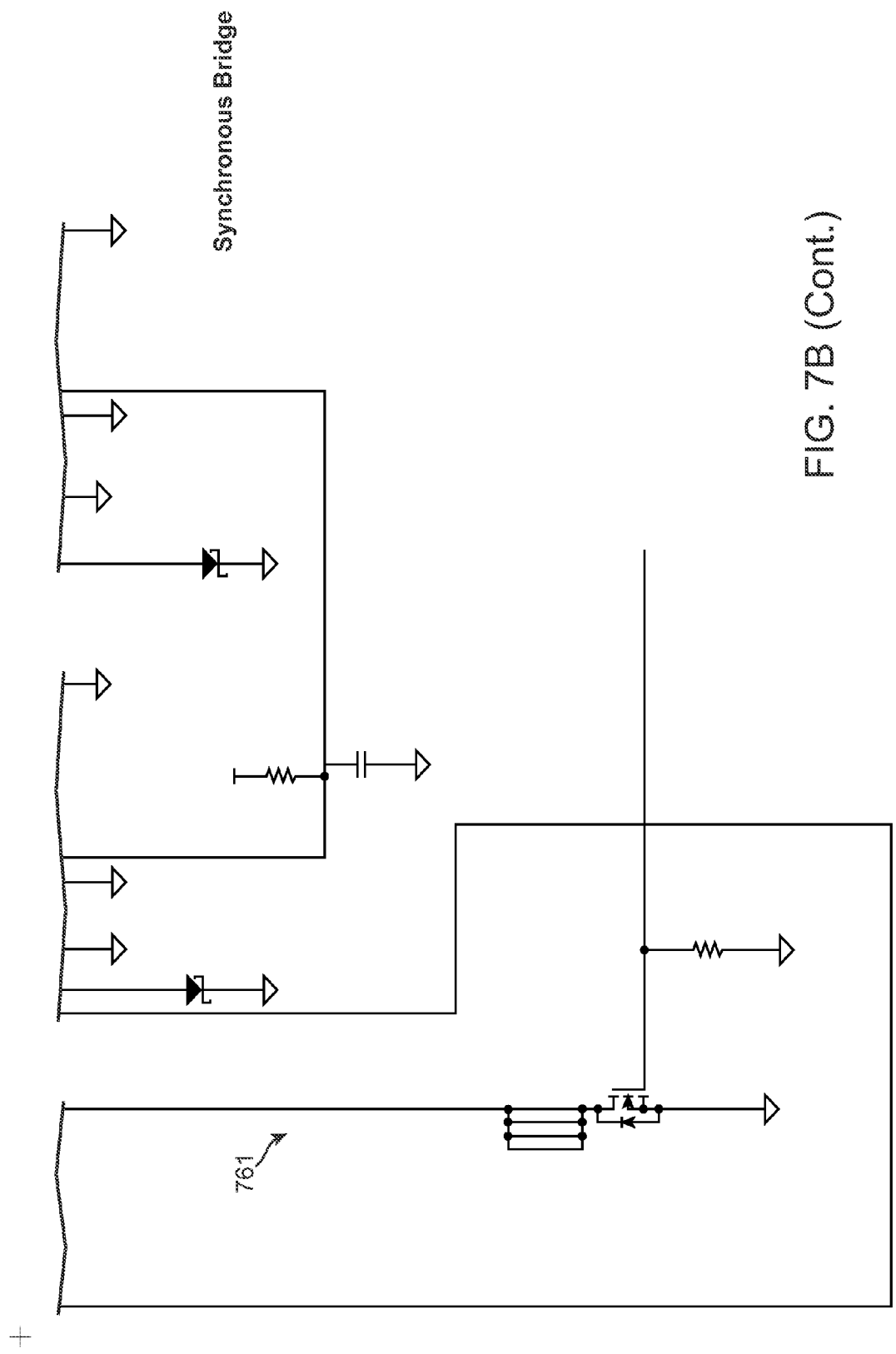
Figure 9F:
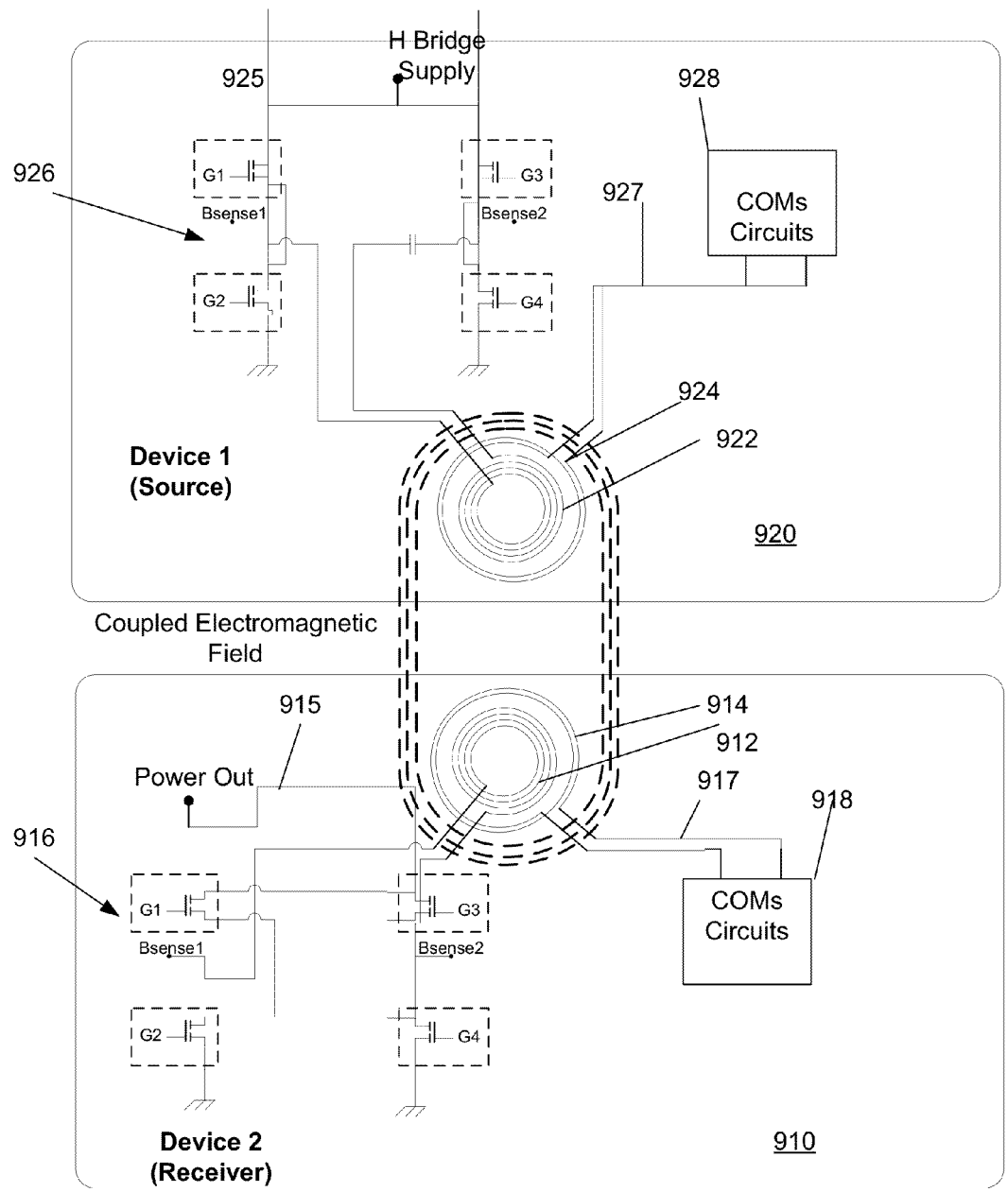
FIG. 9F illustrates an alternative embodiment for inductively coupling a dock and MCD, under another embodiment.

FIG. 9F illustrates an alternative embodiment for inductively coupling a dock and MCD, under another embodiment. In an embodiment shown, each of the MCD 910 and dock 920 includes two coils or coil sections. Specifically, MCD 910 includes power coil 912 and data coil 914, which in the implementation shown, are provided as separate interior (power) and exterior (data) sections of one coil. Similarly, the dock 920 includes power coil 922 and data coil 924, provided as separate interior and exterior sections of a common coil. The MCD's power coil 912 extends to power bus 915 via a bridge type circuit as describe herein. The MCD's data coil 914 extends to data bus 917. Likewise, the dock's power coil 922 extends from power bus 925, and its data coil extends to data bus 927. The power coil 912 of MCD 910 may connect to a sync bridge 916, similar to bridge 730 of FIG. 7. The sync bridge may supply a power out, which as described in FIG. 7A, may extend to a power bus 747 (FIG. 7) to the device electronics 770 (FIG. 7A). Data may be carried from the dock 920 to communication circuits 918, where they are then extended to the signal processor 740 (FIG. 7A). The power coil of 922 of the dock may have a power supply extended through an H Bridge 926 (as described with output 826 of FIG. 9A), which is driven to supply power to the power coil 912 of the MCD 910. Data on dock 920 may be extended (bi-directionally) through the data coil 924 via communication circuits 928 to corresponding coil 914 on the MCD 910.

Protocol to Control Inductive Power/Data Transfer

Figure 10:
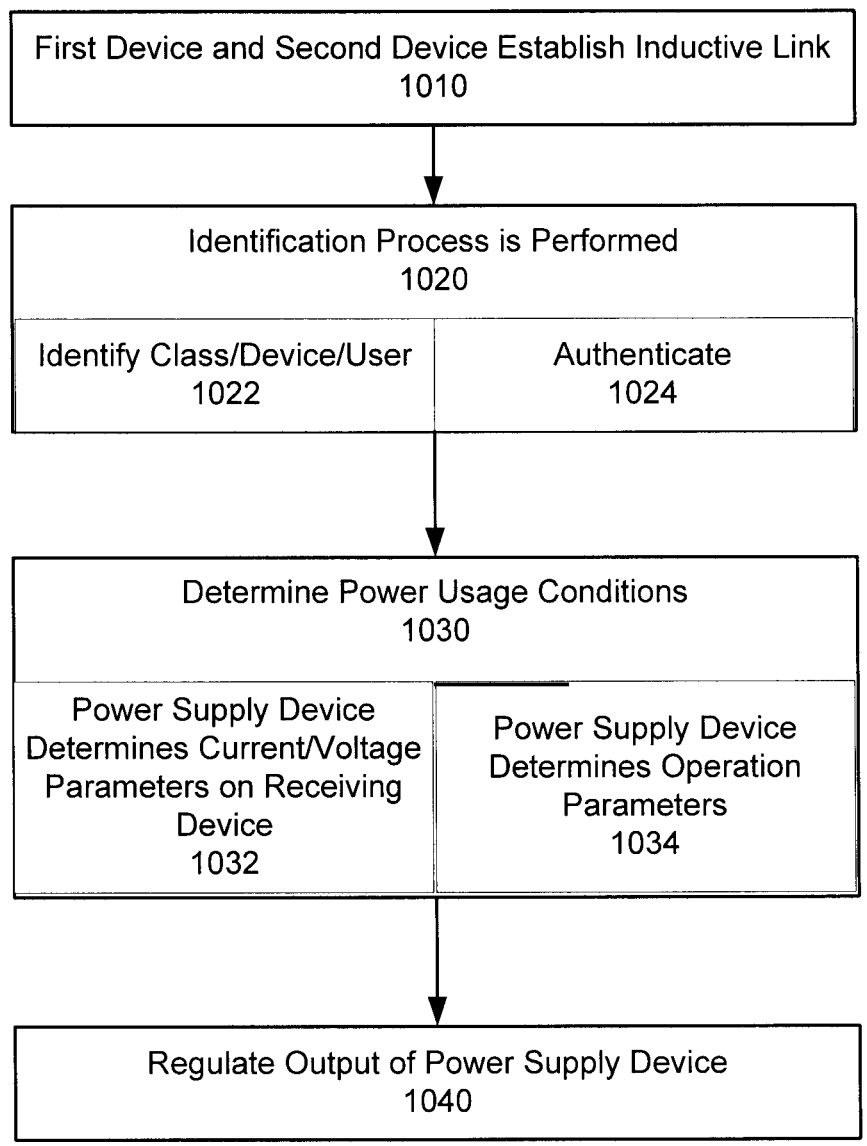
FIG. 10 illustrates a process or method implemented on two computing devices to enable an efficient and safe inductive signaling environment, under embodiment.

FIG. 10 illustrates a process or method implemented on two computing devices to enable an efficient and safe inductive signaling environment, under embodiment. Reference is made to a first device which inductively supplies power, and a second device which inductively receives power and processes it. As described with other embodiments, the two computing devices in the inductive signal transfer may correspond to a mobile computing device and an accessory dock. However, numerous variations and alternatives are possible, such as the use of two similarly designed mobile computing devices in place of the accessory device.

In step 1010, an inductive link is established between two devices. As described with various embodiments, an inductive link may be established by placing magnetic coils of two devices in close proximity to one another. For example, the back façade of the MCD may overlay, or have embedded there, one or more magnetic coils to receive power and/or data from the other device. The other device may correspond to a dock (or another computing device) that includes one or more corresponding coils that inductively transmit/receive signals from the coils of the MCD device when the two devices are placed in contact (or optionally near) one another.

Step 1020 provides that an identification process of one or both devices is performed. In an embodiment, sub-step 1022 provides for one or both of the two devices identifying the other device by class or type. For example, the dock may identify the MCD device by class or type. Likewise, the MCD may identify the dock by class. The identification process may involve, for example, the MCD identifying whether it is being inductively mated to a dock or another device (e.g. another MCD). As another example, the MCD can determine whether it is to supply power exclusively (such as to another accessory device that can only consume power, rather than to the dock).

As an alternative or addition, the process of identification includes one or both of the devices determining the other devices hardware, firmware, or software, including version and compatibility between two devices. For example, software/firmware versions may be determined to identify and/or resolve compatibility issues.

In sub-step 1024, an authentication process identifies whether one or both devices being inductively coupled are authorized to be used. In one implementation, the MCD determines whether the dock is an authorized device. The authorization process may include one or both devices exchanging communications, such as in form of a text-base license agreement. A programmatic exchange of an agreement may implement or confirm authorization. In one variation, the programmatic exchange of an agreement provides consent (from manufacturer of otherwise unauthorized device) to terms/conditions for inductively mating with the other device. In this way, the manufacturer/designer of the technology under the inductive link can implement an authorization step to maintain control over its inductive link technology.

Alternatively, other techniques exist for enabling one device to identify another device by class or type. For example, in one implementation, coils on two inductively coupled devices carry data that identifies that device to another device. As another example, another communication medium, such as a radio-frequency (RF) communication medium (such as BLUETOOTH) may be used to identify two devices to one another.

According to embodiments, the two devices inductively link to transmit/receive power intelligently. In particular, the power receiving device is able to communicate information that is indicative of a voltage or current state of the device. The state may correspond to, for example, (i) over-voltage/current conditions (e.g. the power supply device supplies too much power); (ii) a charge level of a rechargeable battery under the power receiving device; and/or (iii) a load of the power receiving device. Accordingly, in step 1030, power usage conditions are determined for one of the devices that is drawing power from the other. In the implementation where the first device (MCD) receives power from the second device (Dock), power usage conditions are determined for the MCD. The MCD and/or the dock may determine one or more of the power usage conditions. In sub-step 1032, the power receiving device (e.g. MCD) determines power usage conditions corresponding to current/voltage measurements. These measurements may be made on assumption that the power received on the device can or is used to recharge the device's battery. The current/voltage measurements of the power receiving device may correspond to (i) the amount drawn by the battery recharge circuit, (ii) direct measurement of the battery capacity on the power receiving device; (iii) measurement of the load on the power receiving device, including identification of the power level (e.g. high power illumination versus dimmed display) of the device and components that are being operated; and/or (iv) measurement of the output power. In one implementation, the intelligence incorporated with the battery recharge circuit/component identifies the power consumption needs of the power receiving device.

This information is then reported back to the power supply device. The power usage conditions may be reported back through the inductive link, or alternatively, by RF communication (e.g. BLUETOOTH).

As an option, sub-step 1034 may measure or detect power conditions from its own output. In an embodiment, measuring the output of the power supply device can provide a basis for comparison that can be used as a real-time safety check.

On an ongoing basis, step 1040 provides that the transmission of power across the inductive link is regulated in real-time. The power supply device (e.g. dock) may use feedback from the MCD in order to determine power usage conditions on a real-time basis. A real-time control loop corresponds to the power supply device responding to information it determines from the power receiving device (sub-step 1032), in order to enable the power supply to track and adjust its power output to match the needs or power mode of the receiving device. The power supply device may also compare its own output with information determined from the power receiving device as a safety check, to protect against, for example, spurious metal contact or malfunctions. In one embodiment, the power supply device measures local current and voltage values (on power supply device), then compares the measurements to corresponding current/voltage values communicated from the power receiving device. An H-bridge (as described with FIG. 8B) is modulated to drive the power with corrections as determined in real-time from information received from the power receiving device. As described below, the power receiving device may communicate current/voltage readings using AM OOK range for an inductively communicated signal.

Figure 11:
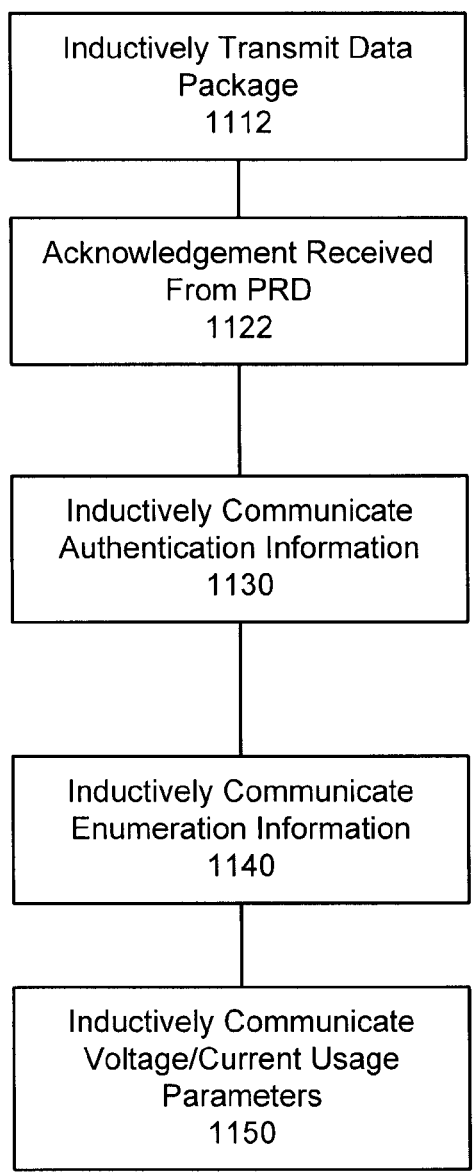
FIG. 11 illustrates steps performed on respective power supply and power receiving devices in enabling two such devices inductively link to one another under a controlled protocol or process, according to an embodiment.
Figure 11:
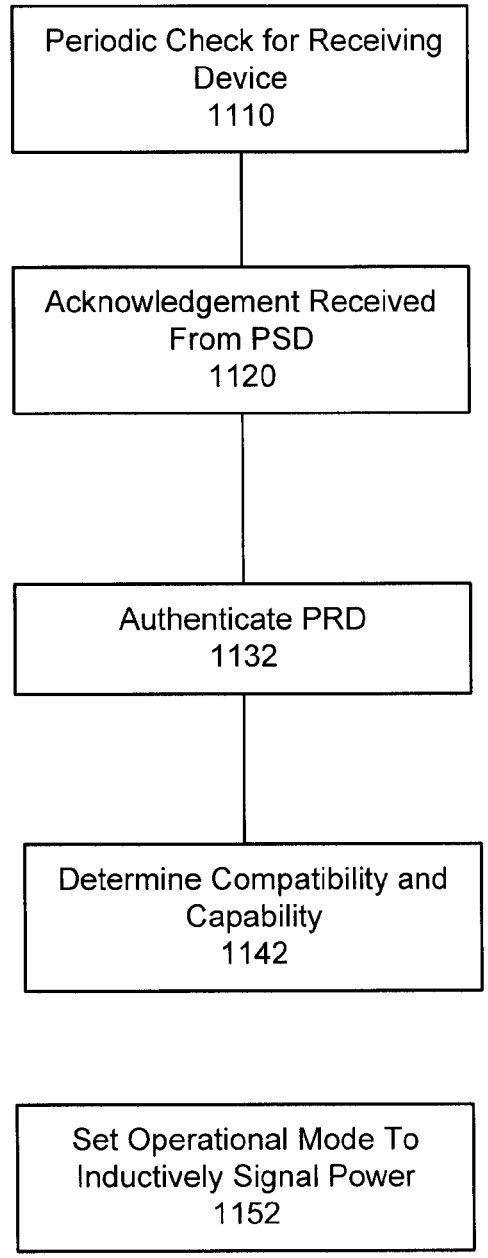

FIG. 11 illustrates steps performed on respective power supply and power receiving devices in enabling two such devices inductively link to one another under a controlled protocol or process, according to an embodiment. An embodiment such as described may be implemented between, for example, a dock (power supply device) and MCD (power receiving device), or between two MCDs, or between a charged MCD (power supply device) and accessory device (power receiving device). As described, two devices are inductively linked, with a series of data communications or exchanges that are communicated across an inductive link in accordance with an inductive communication protocol.

In step 1110, the power supply device makes a periodic check as to whether the power receiving device is inductively linked. For example, power supply device checks to see whether an inductively triggered charge has been triggered on its coil. The check by power supply device is made repeatedly in short periods (e.g. 400 ms), using a fraction (e.g. 25%) of the PWM set at a small interval (e.g. 20 ms). In step 1112, the power receiving device is placed on or near the power supply device, and the power receiving device triggers an inductive signal on the power supply device. As soon as the power receiving device is powered, it sends packets over the inductive communication link (e.g. three packets) until acknowledgement is received (step 1120). Step 1120, the power supply device acknowledges the other device, and the power receiving device processes the acknowledgment 1122.

In step 1130, the power receiving device inductively communicates authentication information to the power supply device. Step 1132 provides that the power supply device signals back corresponding authentication information (precise timing can alternatively be reversed). For example, as described with other embodiments, power supply device may transmit a licensing agreement as part of the authentication information. The power receiving device transmits back acceptance or an accepted licensing agreement.

In step 1140, the power receiving device communicates enumeration information using the inductive link. Likewise, the power supply device communicates its enumeration information. The enumeration information may be used to identify hardware, firmware or software. The information may be used to identify whether compatibility issues exist between the two devices (STEP 1142). The enumeration information may also enable one or both devices to identify the other device by type of kind. This information may be used to enable devices to select performance level or operations, functionality, communication protocol or other aspects for the two devices to communicate or transfer power.

In step 1150, the power receiving device communicates information about its voltage/current usage. In one implementation, the power receiving device uses a timer interrupt to check power and state parameters repeatedly at short intervals (e.g. 2.2 ms), then communicates this information to the power supply device using the inductive link. These measurements provide the power (or voltage, current) calculations made on the supply device in regulating or controlling power to the receiving device. Accordingly, in step 1152, the power supply device receives the information and regulates its power output based on identifying the needs or power levels of the power receiving device. The exchange of information forms a feedback loop that enables the power receiving device to signal power across the inductive link under a process that is controlled based on information supplied from the power receiving device. In one embodiment, the information is communicated across the inductive link. In another embodiment, the information is communicated across other communication mediums, such as through a RF communication medium.

With reference to embodiments of FIG. 9A through FIG. 9C, one embodiment provides that the dock (acting as the power supply device) continuously takes local current and voltage readings, then compares the local current/voltage readings to values determined from the power receiving device (step 1150, 1152). Adjustments to the power delivery are made through driving H bridge (as formed by 1 elements 852, 853, 854, and 855 of FIG. 9B).

Figure 12:
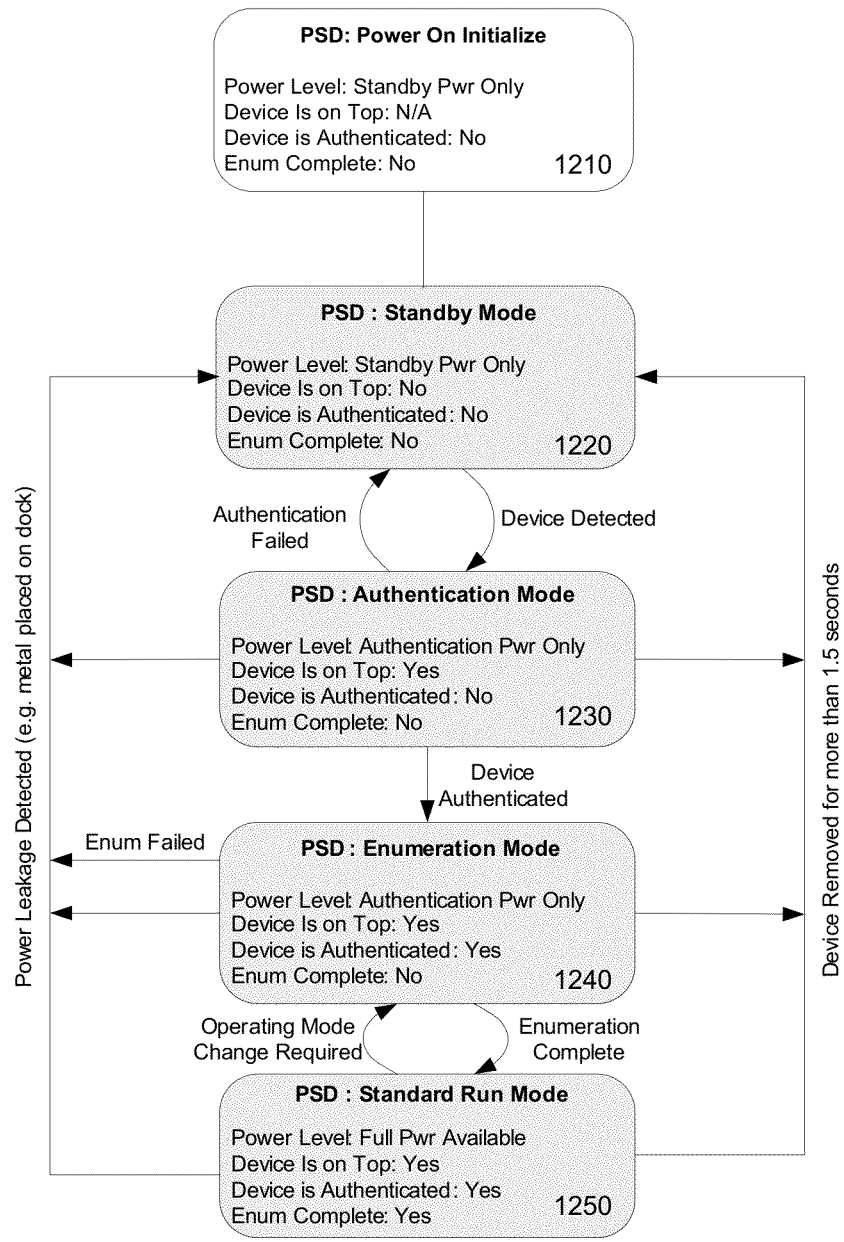
FIG. 12 is a state diagram of the operation status of a power supply device, under an embodiment.

FIG. 12 is a state diagram of the operation status of a power supply device (such as a docking station for an MCD), under an embodiment. As described with other embodiments, the power supply device includes multiple states. The power supply device may operate in four or more modes, based on four or more states. The four states include (i) power level, (ii) whether the power receiving device is present, (iii) whether the power receiving device is authenticated, and (iv) whether the enumeration between the two devices is complete. The modes of the power supply device correspond to power-on-initialize mode 1210, stand-bye mode 1220, authentication mode 1230, enumeration mode 1240, and run mode 1250.

In a power-on-initialize mode 1210, the power supply device carries the following state: (i) power level in stand bye, (ii) state not available, (iii) power receiving device NOT authenticated, and (iv) power receiving device NOT enumerated. In stand-bye mode 1220, the power supply device carries the following state: (i) power level in stand bye, (ii) power receiving device NOT present, (iii) power receiving device NOT authenticated, and (iv) power receiving device NOT enumerated. From standbye mode, the power receiving device can move into authentication mode when another device is detected. In authentication 1230, the power supply device carries the following state: (i) power level for authentication mode, (ii) power receiving device present, (iii) power receiving device NOT authenticated, and (iv) power receiving device NOT enumerated. If authentication mode 1230 fails, the device returns to standby mode 1220. Authentication failure may also be indicative of a power leakage condition (e.g. spurious metal). If authentication mode 1230 is successful, the device switches into enumeration mode 1240.

In enumeration mode 1240, the power supply device carries the following state: (i) power level for authentication mode, (ii) power receiving device present, (iii) power receiving device authenticated, and (iv) power receiving device NOT enumerated. The enumeration mode may fail, indicating a power leakage condition (e.g. spurious metal). Otherwise, the enumeration mode is completed, the device mode transitions to stand-bye run mode 1250. The enumeration mode 1240 may alter or set the operating mode 1250. In the operating mode, the power supply device carries the following state: (i) power level set by enumeration or protocol (full power available), (ii) power receiving device present, (iii) power receiving device authenticated, and (iv) power receiving device enumerated.

With regard to the modes of operation for the power supply device, anytime the power receiving device is decoupled (e.g. removed from the dock) and then placed back into an inductive engagement, the power receiving device returns to the authentication mode 1230 and progresses to the standard run mode.

In some embodiments, the inductive signal transfer protocol between the dock (or other power supply device) and MCD (are power receiving device) follows a "ping pong" format, where the MCD transmits a packet and the Accessory responds. The packets may not be the same size and may be sent over different modulation schemes. Each round-trip (e.g. MCD initiates and dock responses) may (i) enable regulation of the power transfer signal to the MCD; and (ii) enable peripheral communications between the two devices.

Figure 13:
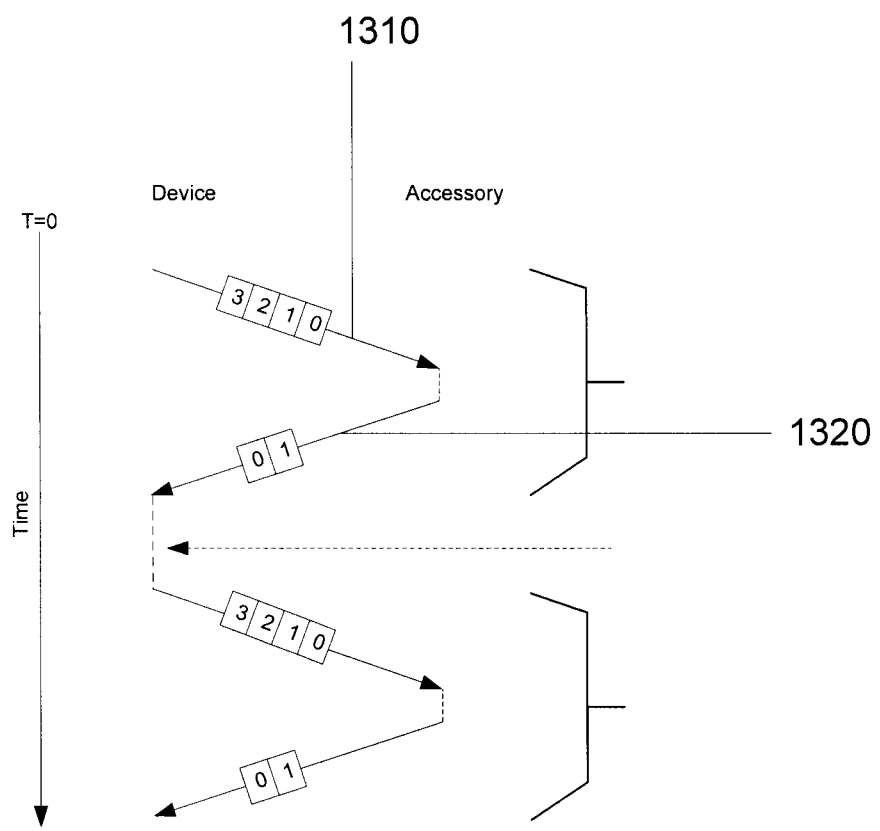
FIG. 13 illustrates communication packets that can be exchanged between devices, according to embodiments described herein.

FIG. 13 illustrates communication packets that can be exchanged between devices, according to embodiments described herein. In particular, FIG. 13 illustrates that the communications between the two devices is asymmetrical, with the MCD communications being longer (and potentially faster) than communications from the dock to the MCD. In FIG. 13, MCD communication 1310 is 4 bytes. As detailed by some prior embodiments, one implementation provides that the MCD communication is signaled as AM OOK 3 MHz. In one embodiment, the signal transfer protocol provides that the dock communication 1320 is 2 bytes and communicated using FSK 110/125 KHz (to signify "1" and "0" values respectively). More defined ranges may alternatively be used (e.g. 113/119 KHz). Each device implements a protocol using the structured data formats (other formats may be used). The protocol's implementations may be provided through programming or configuration of the respective signal processor 740 (FIG. 7A, for MCD), 820 (FIG. 9A) for dock 600 (see FIG. 6).

In an embodiment, the dock operates in standby mode during the following conditions (i) no device is detected as being 'docked'; (ii) device has been detected, but a fault condition exists that forces the dock to power down. The latter condition may arise if, spurious metal is placed on the dock or some other fault occurs. Once fault is detected, the dock may periodically attempt to reconnect with the device. One implementation provides that periodic intervals (400 ms), the dock 600 attempts to provide a small amount of power to see if the MCD 500 is in range. The MCD 500 may be configured (e.g. via programming of the signal processor 740) to ACK back within a short time period (e.g. 25 ms), else the dock 600 returns to sleep state. Else, if the MCD 500 is detected, the dock enters the authentication state.

From standby mode, authentication mode follows when the dock successfully detects the MCD 500. In the authentication mode, the dock 600 attempts to verify that the MCD 500 device detected is in fact a valid, licensed device. In one implementation, the packet format for authentication mode is the same as used in enumeration mode) see following paragraphs) where for MCD 500 communication 1310 corresponds to the command byte and the next 3 bytes contain the Legal Agreement Text (LAT). This packet formatted is repeated until the LAT has been transmitted in full to the dock 600. The dock 600 performs a check sum analysis. In response to receiving the LAT and performing the check sum analysis, the dock 600 submits a Legal Response text back to MCD 500. An example of the packet format for the MCD 500 (i.e. signaling LAT) is provided as follows:

TABLE 1

Packet format for use by MCD 500.

| Ca (Command) | Aa1 (Auth Value 1) | Aa2 (Auth Value 2) | Aa3 (Auth Value 3) |
|---|---|---|---|
| Byte 0 | Byte 1 | Byte 2 | Byte 3 |

An example of the packet format for the dock 600 (i.e. signaling Legal Response text) is provided as follows:

TABLE 2

Packet format for use by dock 600.

| Cp (Command) | Ap1 (Auth Value 1) |
|---|---|
| Byte 0 | Byte 1 |

Command bytes have the same meaning in the various modes. A list of example commands is provided below.

Enumeration mode is reached after the MCD 500 and dock 600 have passed authentication. One purpose that can be achieved with enumeration is a determination of whether particular combination of hardware and firmware on the two devices are compatible. For example, one device may have a later version of firmware that is not compatible with the other.

During enumeration mode, the communication 1310 from the MCD 500 use the following sequence:

TABLE 3

Enumeration mode sequence from MCD 500.

| Ca (Command) | Ea1 (Enum Value 1) | Ea2 (Enum Value 2) | Ea3 (Enum Value 3) |
|---|---|---|---|
| Byte 0 | Byte 1 | Byte 2 | Byte 3 |

The dock 600 returns communication 1320 as follows:

TABLE 4

Enumeration mode sequence from dock 600.

| Cp (Command) | Ep1 (Enum Value 1) |
|---|---|
| Byte 0 | Byte 1 |

Table 5 lists descriptors for the communications 1310 that are sent from the MCD 500 during the enumeration mode:

TABLE 5

Enumeration Mode descriptors for MCD 500.

| Byte# | Name | Symbol | Purpose |
|---|---|---|---|
| 0 | Command_a | Ca | Command byte sent from MCD to Accessory. Contains bit fields with status and instructions. |
| 1 | Enum_Value_from_MCD | Ea1 | MCD data packet used for enumeration. (See modes and enumeration for details) |
| 2 | Enum_Value_from_MCD | Ea2 | MCD data packet used for enumeration. (See modes and enumeration for details) |
| 3 | Enum_Value_from_MCD | Ea3 | MCD data packet used for enumeration. (See modes and enumeration for details) |

Table 6 lists descriptors for the communications 1320 that are sent from the dock 600 during the enumeration mode:

TABLE 6

Enumeration Mode descriptors for MCD 600.

| Byte# | Name | Symbol | Purpose |
|---|---|---|---|
| 0 | Command_p | Cp | Command byte sent from Dock to MCD Contains bit fields with status and instructions. |
| 1 | Enum_Value_from_Accessory | Ep1 | Dock data packet used for enumeration. |

Once enumeration is completed, dock 600 and MCD 500 move to Standard Operating Mode. In this mode, dock 600 provides power to MCD 500 for use in recharging and/or operating that device. During standard operating mode, dock 600 operates a PID loop to regulate the power based on measured current and voltage reported by the MCD 500. In particular, the signal processor 740 (FIG. 7A) may communicate out over the AM out 738 (FIG. 7A) of the communication circuit 728 (FIG. 7A) data that indicates the measured current/voltage. On the dock, the signal is received on the data coil 832 (FIG. 9A) and converted into bit streams by the receiver 850 (FIG. 9A). The MCD 500 reports the measured current/voltage in communication 1310, structured as follows:

TABLE 7

Structure for MCD to communicate current/voltage

| Ca (Command) | Ia (current) | Va (voltage) | Da (A→P) |
|---|---|---|---|
| Byte 0 | Byte 1 | Byte 2 | Byte 3 |

Table 8 displays the packet descriptions of the MCD 500 in the communications 1310.

TABLE 8

Packet descriptions of MCD 500.

| Byte# | Name | Symbol | Purpose |
|---|---|---|---|
| 0 | Command_a | Ca | Command byte sent from MCD to dock. Contains bit fields with status and instructions. |
| 1 | Current_MCD | Ia | Current measurement as reported by the signal processor of MCD (see 740 in FIG. 7A) |
| 2 | Voltage_MCD | Va | Voltage measurement as reported by the signal processor of MCD |
| 3 | Data_from_MCD | Da | MCD data as sent by device host CPU, also enum and authentication info. (Non power related) |

Table 9 illustrates the bit field standard for the communications from the MCD 500 to dock 600, when standard operating mode is in place.

TABLE 9

Bit field standard from MCD communications

| | | | | Bits | | | | |
|---|---|---|---|---|---|---|---|---|
| Byte | 0 | 1 | 2 | 3 | 4 | 5 | 6 | 7 |
| Ca | Turn on PowerFET On | arb | arb | arb | arb | arb | Dc1 | Dc2 |
| Ia | 8 bit unsigned Current Measurement, 4.7 mA per count | | | | | | | |
| Va | 8 bit unsigned Voltage Measurement, 3.0 V + 17.6 mV per count | | | | | | | |
| Da | 8 bit value used for Airboard to Accessory COM (not part of Accessory power) | | | | | | | |

Table 10 represents a response packet from dock 600. Note that dock 600 may, under one implementation, be restricted in sending a packet if it receives a packet. The size and format of the response packet is also fixed.

TABLE 10

Response packet

| Cp (Command) | Dp (Data P→ A) |
|---|---|
| Byte 0 | Byte 1 |

Table 11 lists illustrative packet descriptors for the dock 600.

TABLE 11

| Byte# | Name | Symbol | Purpose |
|---|---|---|---|
| 0 | Command_p | Cp | Command byte sent from Accessory to Airboard Contains bit fields with status and instructions. |
| 1 | Data_from Accessory | Dp | Accessory accessory data sent by Accessory peripherals, attached accessories or Accessory enum/ Authentication info. (Non power related). |

Table 12 illustrates the bit fields for the communications 1320 (dock to MCD).

TABLE 12

| | | | | Bits | | | | |
|---|---|---|---|---|---|---|---|---|
| Byte | 0 | 1 | 2 | 3 | 4 | 5 | 6 | 7 |
| Cp | PowerFET On | | | | | | Dc1 | Dc2 |
| DP | 8 bit value used for Airboard to Accessory COM (not part of Accessory power) | | | | | | | |

Embodiments such as described with FIGS. 7A-7B and through FIG. 9A-9C detail hardware and other components for implementing communication packets of the protocol. As mentioned in some prior embodiments, the communication 1310 (from MCD to dock) may be communicated via OOK at 3 MHz. For example, as stated previously, the signal processor 820 (FIG. 8) of the dock 600 receives an AM demodulated OOK signal which feeds directly into the processor or its hardware (e.g. UART).

The communications from the dock 600 to the MCD 500 may be communicated using FSK at 110-125 KHz (or other ranges such as 113/119 KHz). For example, the communication from dock 600 may be structured as Binary Frequency Shift Keying (BFSK) with the two tones centered at 110 KHz for Mark and 125 KHz for Space.

As described with the various embodiments, the primary control of PWM power signal from the dock 600 is as a function of (i) the input current and (ii) the voltage and current feedback from the MCD 500. The measured output voltage, as sent back from the MCD 500, will modify the PWM by an amount determined by the Output voltage variance from the required set point.

Figure 14:
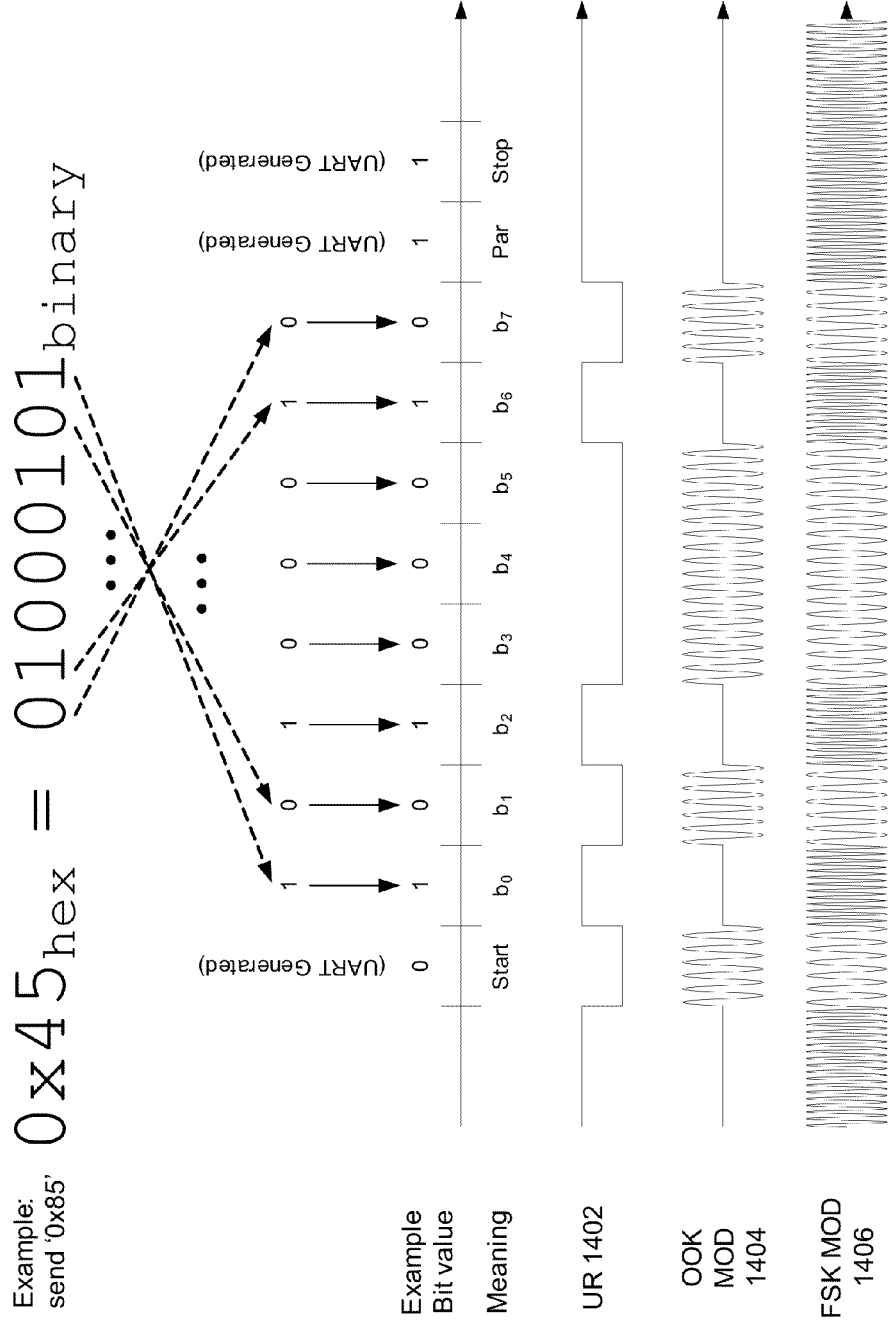
FIG. 14 illustrates various inductive signal modulations, as interpreted in binary form, under an embodiment.

FIG. 14 illustrates various inductive signal modulations, as interpreted in binary form, under an embodiment. In describing FIG. 14, reference again is made to FIGS. 5, 6 and elsewhere. In an embodiment, a standard communication packet exchanged between devices has 11 bits: one bit start, eight bits data, one bit parity, one bit stop. The example provided shows signaling for communication packet that corresponds to a value of 0x85HEX=090091.

A processor on either dock 600 (see FIG. 6) (or power supply device) or MCD 500 (see FIG. 5) generates or receives the signal structured as square wave 1402.

As mentioned in some embodiments, one signal medium exchanged between two devices corresponds to amplitude modulated (AM) or on-off-key (OOK) modulated data signal format 1404, which can be inductively communicated between two devices. In some embodiments, the signal format 1404 is the medium by which the MCD sends data to the dock 69. In the example shown, the OOK modulated data signal format 1404 results in interpretation as illustrated by square wave 1402. The duration of modulation corresponds to a bit value ("1"), and the duration of non-modulation corresponds to another bit value ("0").

As further described by some embodiments, a Frequency Shift Key (FSK) modulation may also be used, particularly in context of signaling data from the dock to the MCD 59. FSK signal 1406 uses durations of high frequency (e.g. 119 KHz) and low frequency (e.g. 113 KHz) to communicate bit values. In the example provided, FSK signal 1406 is equivalent to square wave 1402 as well.

As an alternative, the signal format types exchanged between the two devices may be of the same type. For example, both power supply and receiving device may use OOK modulated data signal format 1404. To enable use of OOK modulated data signal by both devices, the MCD as depicted in FIG. 7A may be modified to include an AM receiver (such as depicted in FIG. 9A or FIG. 9C). Alternatively, both devices may use FSK modulated data signal type 1406. This signal type can be implemented without a receiver on either device (or FM receiver may be provided).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing system comprising:
a first computing device and a second computing device that are each configured to (i) inductively transmit or inductively receive a power signal, and (ii) inductively communicate data using a communication protocol; and
wherein each of the first and second computing devices is configured to inductively communicate data by inductively signaling data packets that are structured in accordance with the communication protocol, which includes at least one of (i) an initial data packet that is transmitted repeatedly until an acknowledgement response data packet is received, or (ii) the acknowledgement response data packet that is transmitted in response to receiving the initial data packet;
wherein the first and second computing device are configured to inductively signal data in response to being brought into sufficient proximity to one another.

2. The computing system of claim 1, wherein data packets that are inductively communicated amongst the first and second computing devices include data packets for authenticating or enumerating at least one of the first or second computing devices.

3. The computing system of claim 1, wherein at least one of the first or second computing devices inductively transmits power to the other device and regulates the power signal in response to data indicative of a voltage or current state of the other device, and wherein each of the first and second computing devices includes one or more coils to signal power and data.

4. The computing device of claim 1, wherein the first and second computing devices are configured to automatically communicate with one another using a radio frequency communication medium upon the first and second computing devices being inductively coupled using the communication protocol.

5. The computing device of claim 1, wherein the communication protocol enables data that is indicative of power requirements of at least one of the first or second computing devices to be inductively communicated amongst the first and second computing devices, and wherein said data is used to modulate the power signal to accommodate the power requirements indicated by the said data.

6. The computing device of claim 5, wherein at least one of the first or second computing devices inductively signals data using the communication protocol by pulse modulating the inductively transmitted power signal.

7. A computing system comprising:
a mobile computing device and an accessory device that are each configured to (i) inductively transmit or inductively receive a power signal, and (ii) inductively communicate data using a communication protocol; and
wherein each of the mobile computing device and the accessory device is configured to inductively communicate data by inductively signaling data packets that are structured in accordance with the communication protocol, which includes at least one of (i) an initial data packet that is transmitted repeatedly until an acknowledgement response data packet is received, or (ii) the acknowledgement response data packet that is transmitted in response to receiving the initial data packet;
wherein the mobile computing device and the accessory device are configured to inductively signal data in response to being brought into sufficient proximity to one another.

8. The computing system of claim 7, wherein data packets that are inductively communicated amongst the mobile computing device and the accessory device include data packets for authenticating or enumerating the at least one of the mobile computing device or the accessory device.

9. The computing device of claim 7, wherein at least one of the mobile computing device or the accessory device inductively transmits power to the other device and regulates the power signal in response to data indicative of a voltage or current state of the other device.

10. The computing device of claim 7, wherein at least one of the mobile computing device or the accessory device signals the data in real-time in order to enable the other device to regulate the power signal, and wherein the communication protocol is a real-time protocol for regulating the transmitted power signal.

11. The computing system of claim 7, wherein the mobile computing device includes processing resources to signal a feedback to the accessory device that includes data to indicate one or more power conditions on the mobile computing device.

12. The computing system of claim 11, wherein the accessory device includes processing resources to respond to the feedback by modulating an output level of the power signal in order to supply more or less power to the mobile computing device.

13. The computing system of claim 12, wherein the processing resources operative on the accessory device detect, from the feedback, whether power leakage is occurring in signaling the power.

14. The computing system of claim 10, wherein the mobile computing device and the accessory device are configured to implement the real-time protocol by inductively transmitting a data signal at the same time as communicating the power signal.

15. An accessory device for a mobile computing device, the accessory device comprising:
one or more coils which are coupled to a power source in order to establish an inductive link with the mobile computing device; and
processing resources configured to:
control a power signal that is inductively transmitted to the mobile computing device using the one or more coils;
wherein the accessory device is configured to inductively signal data to the mobile computing device using a communication protocol in which the accessory device modulates an inductive data signal that communicates data packets which are structured in accordance with the communication protocol;
wherein data packets that are inductively communicated to the mobile computing device using the one or more coils, in accordance with the communication protocol, include an initial data packet that is repeatedly transmitted from the accessory device until an acknowledgement data packet is inductively received from the mobile computing device.

16. The accessory device of claim 15, wherein the processing resources controls the power signal by (i) identifying at least one of current conditions or voltage conditions on the mobile computing device, and (ii) varying a magnitude of the power signal based on the identified conditions.

17. The accessory device of claim 15, further comprising:
an inductive receiver that is coupled to the processing resources and to at least one of the one or more coils;
wherein the inductive receiver communicates data that is indicative of the one or more current or voltage conditions to the processing resources.

18. A computing device comprising:
one or more coils;
processing resources, operative with the one or more coils, to (i) detect a power signal that is inductively transmitted over the one or more coils from an accessory device, and (ii) signal a feedback to the accessory device that includes data that is indicative of a voltage or current condition on the computing device;
wherein the computing device is configured to inductively signal data packets to the accessory device using a communication protocol;
wherein the data packets that are inductively communicated to the accessory device, in accordance with the communication protocol, include an acknowledgement response data packet that is transmitted from the computing device in response to the computing device being brought into sufficient proximity or contact with the accessory device to inductively receive an initial data packet.

19. The computing device of claim 18, further comprising a housing that contains a plurality of components of the computing device, and wherein the one or more coils are embedded within a housing segment that comprises a portion of the housing, apart from a remainder of the housing.

20. The computing device of claim 18, wherein the processing resources are configured to signal the feedback inductively using one of the one or more coils.

21. The computing device of claim 19, wherein the processing resources, the one or more coils, and the housing segment are modularized into one manufactured unit.

22. The computing device of claim 18, wherein the data packets that are inductively communicated to the accessory device include data packets for authenticating or enumerating the computing device to the accessory device.

23. The computing device of claim 22, wherein the accessory device is configured to enable or disable one or more features in response to receiving the data packets for authenticating or enumerating the computing device.

24. An accessory device for a computing device, the accessory device comprising:
one or more coils;
processing resources, operative with the one or more coils, to (i) inductively transmit a power signal over the one or more coils to the computing device, and (ii) respond to a feedback signal communicated from the computing device that includes data to indicate how the accessory device is to modulate the power signal based on a power level or consumption on the computing device;
wherein the accessory device and the computing device are configured to inductively signal data to one another using a communication protocol;
wherein data packets that are inductively communicated amongst the computing device and the accessory device, in accordance with the communication protocol, include an initial data packet that is repeatedly transmitted from the accessory device until an acknowledgement data packet is received from the computing device.

25. The accessory device of claim 24, wherein the feedback signal is inductively received using the one or more coils.

26. The accessory device of claim 24, wherein the processing resources include one or more processors.

27. The accessory device of claim 24, further comprising a housing that includes a platform to support a back face of the computing device.

28. The accessory device of claim 27, wherein the platform includes one or more magnets that are positioned to magnetically couple to correspondingly positioned magnetically attractive material on the back face of the computing device.

29. The accessory device of claim 24, wherein the data packets that are inductively communicated amongst the computing device and the accessory device include data packets for authenticating or enumerating the computing device to the accessory device.

30. The accessory device of claim 29, wherein the accessory device is configured to enable or disable one or more features in response to receiving the data packets for authenticating or enumerating the computing device.

31. A device comprising:
one or more coils positioned on the device to establish an inductive link with a second device;
one or more power components to receive power from a power source and to generate a power signal to be provided over the inductive link; and
processing resources to:
maintain the device in a low power state in which the one or more coils are substantially not powered;
detect the second device positioned to be inductively linked with the device; and
respond to detecting the second device by transmitting the power signal using the one or more coils;

wherein each of the device and the second device are configured to inductively signal data to one another using a communication protocol in which one or both devices modulate an inductive data signal that communicates data packets which are structured in accordance with the communication protocol;

wherein the data packets that are inductively communicated amongst the device and the second device, in accordance with the communication protocol, include (i) an initial data packet that is repeatedly transmitted from at least the device until an acknowledgement response data packet is received from the second device, and (ii) the acknowledgement response data packet that is transmitted from at least the second device in response to the second device being brought into sufficient proximity or contact with the device to inductively receive the initial data packet.

32. The device of claim 31, wherein in the low power state, the processing resources are configured to activate the one or more coils for short, intermittent durations in order to determine whether the second device is positioned to be inductively linked with the device.

33. The device of claim 31, wherein the processing resources are configured to activate the one or more coils in response to detecting the second device by identifying one or more of (i) an identity of the second device, (ii) a type of the second device, or (iii) one or more capabilities of the second device.

34. The device of claim 31, wherein the data packets that are inductively communicated amongst the device and the second device include data packets for authenticating or enumerating the device to the second device.

35. A method for operating a device to inductively link with a second device, the method comprising:
    maintaining the device in a low power state in which one or more coils are substantially not powered;
    repeatedly checking for the second device to be sufficiently proximate to the device to enable the two devices to be to be inductively linked;
    responding to detecting the second device by inductively signaling a power signal to the second device using the one or more coils; and
    inductively exchanging data with the second device in order to regulate the power signal that is signaled to the second device;
    wherein inductively exchanging data includes using a communication protocol to exchange data.

* * * * *